(12) United States Patent
Miran et al.

(10) Patent No.: US 12,549,908 B2
(45) Date of Patent: Feb. 10, 2026

(54) HEARING DEVICE WITH MOTION SENSOR USED TO DETECT FEEDBACK PATH INSTABILITY

(71) Applicant: STARKEY LABORATORIES, INC., Eden Prairie, MN (US)

(72) Inventors: Sina Miran, Silver Spring, MD (US); Tao Zhang, Eden Prairie, MN (US); Henning Schepker, Oldenburg (DE)

(73) Assignee: Starkey Laboratories, Inc., Eden Prairie, MN (US)

( * ) Notice: Subject to any disclaimer, the term of this patent is extended or adjusted under 35 U.S.C. 154(b) by 476 days.

(21) Appl. No.: 17/927,248

(22) PCT Filed: May 18, 2021

(86) PCT No.: PCT/US2021/032928
§ 371 (c)(1),
(2) Date: Nov. 22, 2022

(87) PCT Pub. No.: WO2021/242571
PCT Pub. Date: Dec. 2, 2021

(65) Prior Publication Data
US 2024/0298121 A1 Sep. 5, 2024

Related U.S. Application Data

(60) Provisional application No. 63/150,127, filed on Feb. 17, 2021, provisional application No. 63/031,937, filed on May 29, 2020.

(51) Int. Cl.
*H04R 25/00* (2006.01)
*H03H 21/00* (2006.01)

(52) U.S. Cl.
CPC ....... *H04R 25/453* (2013.01); *H03H 21/0043* (2013.01); *H04R 25/305* (2013.01); *H03H 2021/0061* (2013.01)

(58) Field of Classification Search
CPC .......................... H04R 25/453; H04R 25/305; H04R 2225/49; H04R 2460/01
See application file for complete search history.

(56) References Cited

U.S. PATENT DOCUMENTS 6,236,731 B1 * 5/2001 Brennan ............ H03H 17/0294
381/74
6,377,682 B1 4/2002 Benesty et al.
(Continued)

FOREIGN PATENT DOCUMENTS

EP 2071875 6/2011

OTHER PUBLICATIONS

European Patent Application No. 23161044, filed Mar. 9, 2023; European Search Report, issued Jul. 11, 2023; 7 pages.
(Continued)

*Primary Examiner* — Suhan Ni
(74) *Attorney, Agent, or Firm* — Mueting Raasch Group

(57) ABSTRACT

An audio input signal is digitized via circuitry of an ear-wearable device. An adaptive feedback canceller has an adaptive filter producing an output that is inserted into the digitized audio input signal to cancel feedback. A motion detector provides a motion signal indicative of motion of the ear-wearable device. A processor is operable to determine a change in a feedback path based on the motion signal. The processor causes the adaptive filter to have faster adaption in response to the change in the feedback path is above a first threshold. The processor also causes the adaptive filter to have slower adaption in response to the change in the feedback path being below a second threshold.

20 Claims, 11 Drawing Sheets

(56) References Cited

U.S. PATENT DOCUMENTS

| | | |
|---|---|---|
| 6,947,549 B2 | 9/2005 | Yiu et al. |
| 7,650,004 B2 | 1/2010 | Durant |
| 7,738,667 B2 | 6/2010 | Bramsløw |
| 8,355,794 B2 | 1/2013 | Lineaweaver et al. |
| 8,942,398 B2 | 1/2015 | Salvetti |
| 9,723,413 B2 | 8/2017 | Dittberner et al. |
| 10,097,930 B2 | 10/2018 | Nakagawa et al. |
| 10,803,881 B1 | 10/2020 | Fazeli |
| 10,811,028 B2 | 10/2020 | Bucher et al. |
| 2013/0170660 A1* | 7/2013 | Kristensen ........... H04R 25/305 381/60 |
| 2016/0111107 A1 | 4/2016 | Erdogan |
| 2017/0061978 A1 | 3/2017 | Wang |
| 2017/0156009 A9 | 6/2017 | Natarajan |
| 2019/0253813 A1 | 8/2019 | Pedersen et al. |
| 2020/0020313 A1 | 1/2020 | Hua et al. |
| 2021/0195345 A1 | 6/2021 | Fitz |

OTHER PUBLICATIONS

Carbajal et al: "Joint NN-Supported Multichannel Reduction of Acoustic Echo, Reverberation and Noise", arxiv.org, Cornell University Library, 201 Olin Library Cornell University Ithaca, NY 14853, Jul. 27, 2020 (Jul. 27, 2020), XP081704527, DOI: 10.1109/TASLP.2020.3008974.

Cortes: "Recurrent Neural Networks", , Jan. 19, 2017 (Jan. 19, 2017), XP093061689, Retrieved from the Internet: URL:https://www.mathematik.uni-muenchen.de/~deckerVteaching/WS1819/ATML/torregrosa_recurrent_neural_networks.pdf [retrieved on Jul. 6, 2023].

Cyberlympha: "Recurrent Neural Networks in Reinforcement Learning", , Feb. 21, 2022 (Feb. 21, 2022), XP093061653, Retrieved from the Internet: URL:https%3A%2F%2Fmedium.com%2F%40cyberlympha%2Frecurrentneural-networks-in-reinforcement-learning-11600819ede4 [retrieved on Jul. 6, 2023].

Haubner et al: "Deep Learning-Based Joint Control of Acoustic Echo Cancellation, Beamforming and Postfiltering", arxiv.org, Cornell University Library, 201 Olin Library Cornell University Ithaca, NY 14853, Mar. 3, 2022 (Mar. 3, 2022), XP091176293.

Mader, Andreas, et al.. "Step-size control for acoustic echo cancellation filters—an overview." Signal Processing 80.9 (2000): 1697-1719.

Spriet, Ann, et al. "Adaptive feedback cancellation in hearing aids with linear prediction of the desired signal." IEEE Transactions on signal processing 53.10 (2005): 3749-3763.

Kwong, Raymond H., et al.. "A variable step size LMS algorithm." IEEE Transactions on signal processing 40.7 (1992): 1633-1642.

Arenas-Garcia, Jeronimo, et al. "Combinations of adaptive filters: performance and convergence properties." IEEE Signal Processing Magazine 33.1 (2015): 120-140.

A. Spriet, et al., "Adaptive feedback cancellation in hearing aids," J. Franklin Inst., vol. 343, No. 6, pp. 545-573, Sep. 2006.

J. Huo, et al., "A robust transform domain echo canceller employing a parallel filter structure," Signal Processing, vol. 86, No. 12, 2006.

International Patent Application No. PCT/US2021/032928, filed May 18, 2021; International Preliminary Report on Patentability issued Dec. 8, 2022; 16 pages.

PCT Search Report and Written Opinion for PCT/US2021/032928 dated Jul. 9, 2021 (23 pages).

Nordholm, Sven, et al. "Stability-controlled hybrid adaptive feedback cancellation scheme for hearing aids." The Journal of the Acoustical Society of America 143.1 (2018): 150-166.

Costa, Márcio H., et al.. "A robust variable step size algorithm for LMS adaptive filters." 2006 IEEE International Conference on Acoustics Speech and Signal Processing Proceedings. vol. 3. IEEE, 2006.

Vega, Leonardo Rey, et al. "A new robust variable step-size NLMS algorithm." IEEE Transactions on Signal Processing 56.5 (2008): 1878-1893.

* cited by examiner

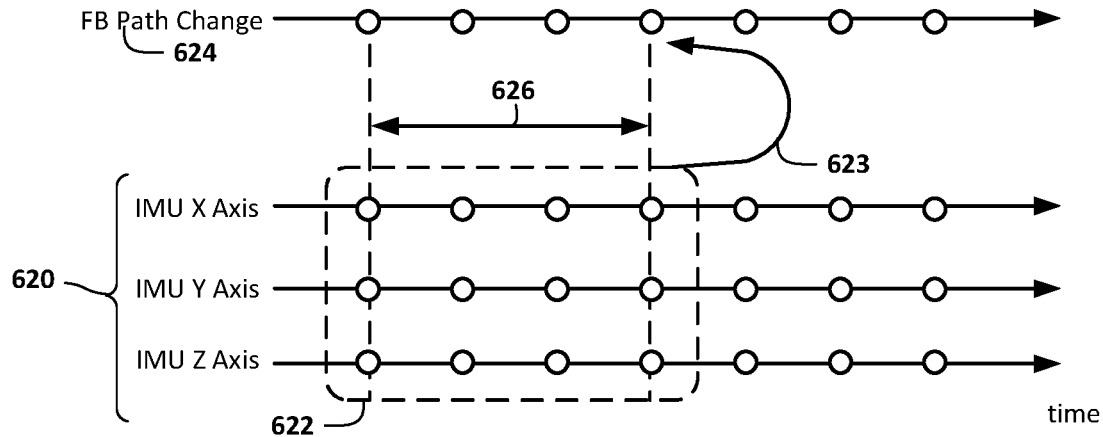

Algorithm 1 Real-Time Step Size Adjustment in AFC Using an IMU

Require: IMU Bandpass Filter, Smoothing coefficients $\kappa_R$ and $\kappa_F$, Threshold $T_0$, large and small step size values $\tau_L$ and $\tau_S$ for AFC

Input: IMU Signal in Real-Time $s(t) = [s_x(t), s_y(t), s_z(t)]^T$

Output: AFC Step Size in Real-Time

1: Compute $s_B(t)$ by bandpass filtering the IMU axes and set $m(t) = |s_B(t)|$.
2: Compute asymmetric smoothing of IMU magnitude $m_S(t)$ as:
3: if $m(t) > m_S(t-1)$ then
4:     $m_S(t) = m_S(t-1) + \kappa_R (m(t) - m_S(t-1))$
5: else
6:     $m_S(t) = m_S(t-1) + \kappa_F (m(t) - m_S(t-1))$
7: end if
8: if $m_S(t) > T_0$ then
9:     Set AFC step size to $\tau_L$
10: else
11:     Set AFC step size to $\tau_S$
12: end if

FIG. 6C

HEARING DEVICE WITH MOTION SENSOR USED TO DETECT FEEDBACK PATH INSTABILITY

RELATED PATENT APPLICATIONS

This application is a U.S. National Stage application under 35 U.S.C. 371 of PCT Application No. PCT/US2021/032928 filed May 18, 2021, which claims the benefit of U.S. Provisional Application No. 63/150,127, filed Feb. 17, 2021 and U.S. Provisional Application No. 63/031,937, filed May 29, 2020, the entire contents of which are hereby incorporated by reference.

SUMMARY

This application relates generally to ear-level electronic systems and devices, including hearing aids, personal amplification devices, and hearables. In one embodiment, a method and device utilize an input audio signal from an input sensor. The audio input signal is digitized via circuitry of an ear-wearable device. An adaptive feedback canceller has an adaptive filter producing an output that is inserted into the digitized audio input signal to cancel feedback. A motion detector provides a motion signal indicative of motion of the ear-wearable device. A processor is operable to determine a change in a feedback path based on the motion signal. The processor causes the adaptive filter to have faster adaption in response to the change in the feedback path is above a first threshold. The processor also causes the adaptive filter to have slower adaption in response to the change in the feedback path being below a second threshold.

In another embodiment, a method and device utilize an input audio signal from an input sensor. The audio input signal is digitized via circuitry of an ear-wearable device. An adaptive feedback canceller has an adaptive filter producing an output that is inserted into the digitized audio input signal to cancel feedback. A motion detector provides a motion signal indicative of motion of the ear-wearable device. A mode controller is configured to determine a change in a feedback path based on the motion signal. The mode controller sets a first mode of the adaptive filter in response to determining the change in the feedback path exceeding a first threshold. The adaptive filter has a faster adaptation to feedback perturbations in the first mode compared to a second mode. The mode controller further sets the second mode of the adaptive filter if the change in the feedback path is below a second threshold.

In another embodiment, a method and device utilize an input audio signal from an input sensor, the audio input signal being digitized via circuitry of an ear-wearable device. An adaptive feedback canceller has first and second adaptive filters whose output is combined to form a combined output that is inserted into the digitized audio input signal to cancel feedback. A motion detector provides a motion signal indicative of motion of the ear-wearable device. A filter mixing controller is configured to determine a change in a feedback path based on the motion signal. The filter mixing controller sets a first mixing weight of the first and second adaptive filters in response to the change in the feedback path exceeding the first threshold. The first mixing weight causes the combined output of the first and second adaptive filters to have a faster adaptation to feedback perturbations compared to a second mixing weight. The filter mixing controller sets the second mixing weight in response to the change in the feedback path being below the second threshold.

The above summary is not intended to describe each disclosed embodiment or every implementation of the present disclosure. The figures and the detailed description below more particularly exemplify illustrative embodiments.

BRIEF DESCRIPTION OF THE DRAWINGS

The discussion below makes reference to the following figures.

FIG. 6B is a diagram showing a decoder used for feedback path change detection according to an example embodiment;

FIG. 6C is a table showing an algorithm for feedback path change detection according to another example embodiment;

The figures are not necessarily to scale. Like numbers used in the figures refer to like components. However, it will be understood that the use of a number to refer to a component in a given figure is not intended to limit the component in another figure labeled with the same number.

DETAILED DESCRIPTION

Figure 1:
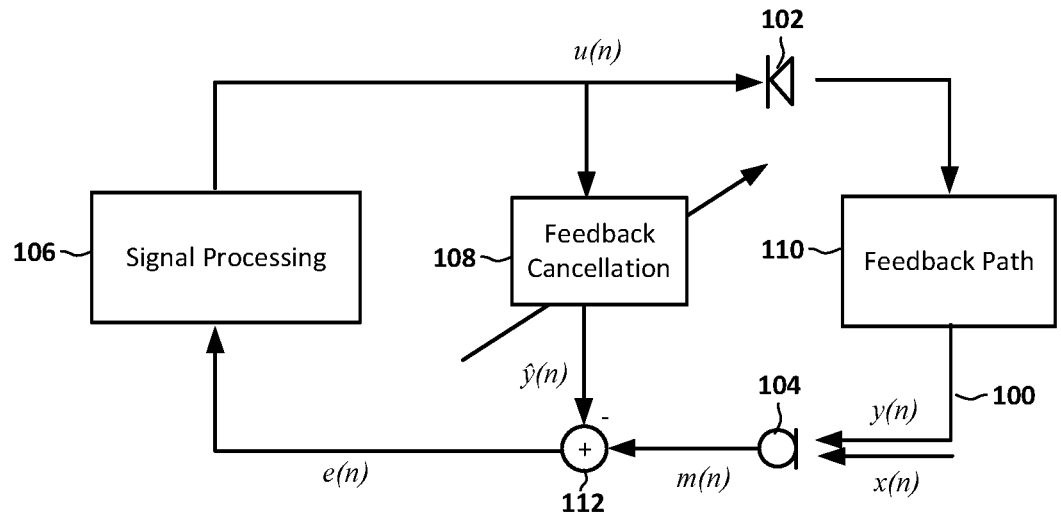
FIG. 1 is a schematic diagram of a hearing device with feedback cancelling according to an example embodiment.

Embodiments disclosed herein are directed to feedback detection in an ear-worn or ear-level electronic device. Such a device may include cochlear implants and bone conduction devices, without departing from the scope of this disclosure. The devices depicted in the figures are intended to demonstrate the subject matter, but not in a limited, exhaustive, or exclusive sense. Ear-worn electronic devices (also referred to herein as "hearing devices" or "ear-wearable devices"), such as hearables (e.g., wearable earphones, ear monitors, and earbuds), hearing aids, hearing instruments, and hearing assistance devices, typically include an enclosure, such as a housing or shell, within which internal components are disposed.

Typical components of a hearing device can include a processor (e.g., a digital signal processor or DSP), memory circuitry, power management and charging circuitry, one or more communication devices (e.g., one or more radios, a near-field magnetic induction (NFMI) device), one or more antennas, one or more microphones, buttons and/or switches, and a receiver/speaker, for example. Hearing devices can incorporate a long-range communication device, such as a Bluetooth® transceiver or other type of radio frequency (RF) transceiver.

The term hearing device of the present disclosure refers to a wide variety of ear-level electronic devices that can aid a person with impaired hearing. The term hearing device also refers to a wide variety of devices that can produce processed sound for persons with normal hearing. Hearing devices include, but are not limited to, behind-the-ear (BTE), in-the-ear (ITE), in-the-canal (ITC), invisible-in-canal (IIC), receiver-in-canal (RIC), receiver-in-the-ear (RITE) or completely-in-the-canal (CIC) type hearing devices or some combination of the above. Throughout this disclosure, reference is made to a "hearing device" or "ear-wearable device," which are understood to refer to a system comprising a single left ear device, a single right ear device, or a combination of a left ear device and a right ear device.

Embodiments described below utilize adaptive feedback cancellation (FBC), which involves detecting feedback affecting a hearing device. Various FBC systems are widely used and provide benefit for many patients with many devices, such as those popular large vents and open fittings. Perturbations pose challenges to traditional adaptive feedback cancellation algorithms. Such perturbations include strong disturbances caused by significant feedback path changes due to user movements/changes of enclosure or environment around hearing devices.

Changes in the feedback path can occur under a variety of conditions including head motion, eating, and movement of external objects, like a mobile phone, close to the ear. In embodiments described below, the active FBC can be made robust against perturbations due to variations to the incoming signal statistics and feedback path changes. One way to address this problem is to precisely and promptly detect the perturbations due to feedback path change and make the adjustment to a different adaptation rate, e.g., when the feedback path change is detected, the system adapts at a higher rate for a fast re-convergence otherwise the adaptation rate reduces for a steady state with higher added stable gain.

Under a changing feedback path, a fast adaption rate in the FBC can avoid chirping and howling effects. On the other hand, under a relatively constant feedback path, a fast adaption rate in FBC results in unnecessarily large updates to the filter and reduces both the added stable gain (ASG) and sound quality. Therefore, when the feedback path is not changing significantly, a slow adaption rate and small step size can be used in FBC for optimal performance. In this disclosure, a motion sensor is used in the hearing device to adjust the adaption speed of FBC by changing a setting of at least one adaptive filter. This approach can be combined with other adjustment methods, like computing a linear or convex combination of a slow and a fast FBC filter running in parallel, to improve their performance.

In FIG. 1, a schematic diagram shows a feedback cancellation system according to an example embodiment. The system includes a loudspeaker 102 (also referred to as a receiver), a microphone 104, a signal processing circuit 106 (e.g., amplifier, equalizer, noise reduction, etc.) and a feedback canceller 108. In this diagram, x(n) is the incoming signal and y(n) is the feedback signal, the latter resulting from a feedback path 110 existing between the speaker 102 and microphone 104. The incoming signal x(n) (which may include impulses, speech, music, noise, etc.) is picked up by the microphone modified by forward signal processing unit, played out through the receiver/loudspeaker as u(n) and then picked up again by the microphone as a feedback signal y(n). There is a delay between the incoming signal onset and when it is picked again as feedback by the microphone 104. This delay is proportional to the forward processing latency and the length of the feedback path 110.

The feedback canceller 108 uses an adaptive filter to generate cancellation signal $\hat{y}(n)$, which is an estimate of the feedback signal and is combined with the microphone signal m(n) at summation block 112. The output of the summation block 112 is error signal e(n), which is ideally close to or the same as the input signal x(n), depending on how well the cancellation signal $\hat{y}(n)$ matches feedback y(n).

When there is a sudden change to the feedback path 110 (which in some cases is reflected in the statistics of incoming signal x(n)), the steady state of the adaptive filtering is undermined, and it needs some time to re-converge. The step size in the adaptive filter update is a trade-off between fast convergence rate/good tracking ability on the one hand and low mis-adjustment on the other hand. In embodiments described herein, the adaptive filter step size can be time-varying to adapt to sudden changes in the feedback path 110 that affects the feedback cancellation system.

The convergence of typical adaptive filtering algorithms assumes a stable feedback path and stationary input signal. However, this assumption can be difficult to achieve in practice. Many practical scenarios or actions made by users, e.g. user sneezing, standing up and sitting down, phone moving close to the ears, can lead to noticeable changes to the acoustic feedback paths. Additionally, the transition between stationarity periods of the incoming signal leads to outliers in the error signal, resulting in local divergence of the adaptive filter. These perturbations are addressed by the disclosed embodiments.

The proposed method for FBC aims to detect when the feedback path is changing significantly and when it is relatively constant (e.g., exhibits a minimal amount of change). The adaption speed of FBC is adjusted accordingly to provide an improved sound quality and ASG under a static feedback path, while preventing chirping and howling under a dynamic feedback path. Embodiments described below utilize a motion sensor to detect feedback path changes in combination with acoustic features for adjusting the adaption speed of FBC.

Figure 2:
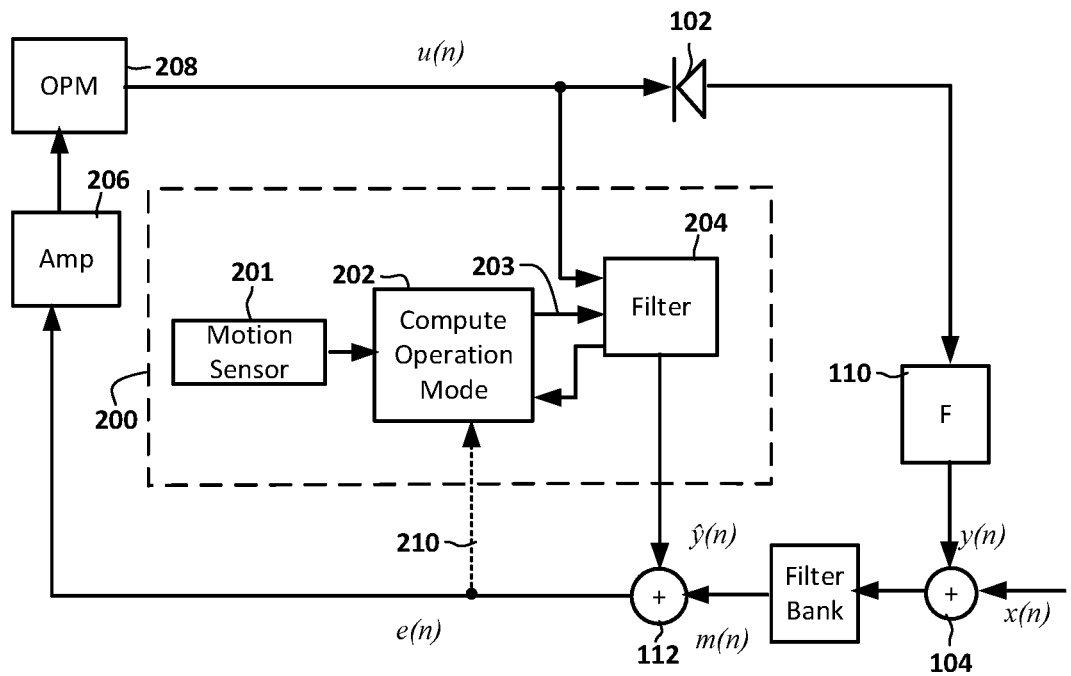
FIG. 2 is a schematic diagram of a feedback canceller according to an example embodiment.

In FIG. 2, a diagram illustrates details of a feedback cancellation circuit 200 according to an example embodiment. A signal from one or more motion sensors 201 is input to an operational mode controller 202 that detects a current or imminent change in characteristics of the feedback path 110. In response, the operational mode controller 202 sends a feedback path change signal 203 that causes changes in parameters of an adaptive filter 204. The parameter changes can cause the adaptive filter 204 to either converge faster in case of feedback path changes, or become more robust in case of feedback path stability. The motion sensor 201 may include any combination of an accelerometer, gyroscope, tilt detector, compass, etc.

As indicated by dashed line 210, the operational mode controller 202 may optionally use statistics of the audio signal to augment the decision to change adaptive filter modes in addition to the signals from the motion sensor 201. In this example the error signal e(n) is used as the input 210 although in other embodiments the microphone signal m(n) or other processing stage of the signal may be used. Some existing feedback control algorithms use the microphone and/or error signals to identify a change in input signal statistics that signal a feedback path change. However, these acoustic features can sometimes erroneously indicate a change in feedback path when the feedback path is actually static. Thus the microphone signal, error signal, or some other internal representation of the audio signal can be used with the signal from the motion sensor 201 to jointly trigger the change in filter mode. As the motion sensor 201 and audio signals (e.g., e(n)) are generally independent, this can lead to a more accurate indication of feedback changes than just one indicator alone.

Robustness of the adaptive filter 204 signifies insensitivity to a certain amount of deviations from statistical modeling assumptions due to some outliers. The sensitivity to outliers increases with the convergence speed of the adaptation algorithm and limits the performance of signal processing algorithms, especially when fast convergence is required such as in feedback cancellation. The operational mode controller 202 switches the filter 204 between these modes based on an estimate of instability. These mode changes applied to the filter 204 include a change in step size used by the adaptive filter 204 and a change in algorithm used by the adaptive filter 204. Note that more than two modes may be used by the operational mode controller 202 and adaptive filter 204, although generally the changes will be discrete. For example, if three modes are available, the output of the operational mode controller 202 may be an integer 0, 1, 2, indicating which mode is to be used by the filter 204.

In this approach, the adaptive filter uses two or more different operational modes depending on whether a feedback path change is detected or not. An example of different operation modes includes switching between the normalized least mean squared (NLMS) and the signed NLMS algorithms for updating the filter coefficients, where the former yields a higher adaption speed and the latter provides more robust updates. Another example of different operation modes comprises changing a step size for the same filter or for different filters.

Also seen in FIG. 2 is an amplifier 206 that is part of the signal processing block 106 shown in FIG. 1. An output phase modulator 208 is a component that assists in feedback cancellation by adjusting a phase of the output signal u(n) to avoid or contain entrainment of the adaptive feedback canceller 200. The output phase modulator 208 may work independently of the operational mode controller 202 and other components of the feedback canceller 200.

Figure 3:
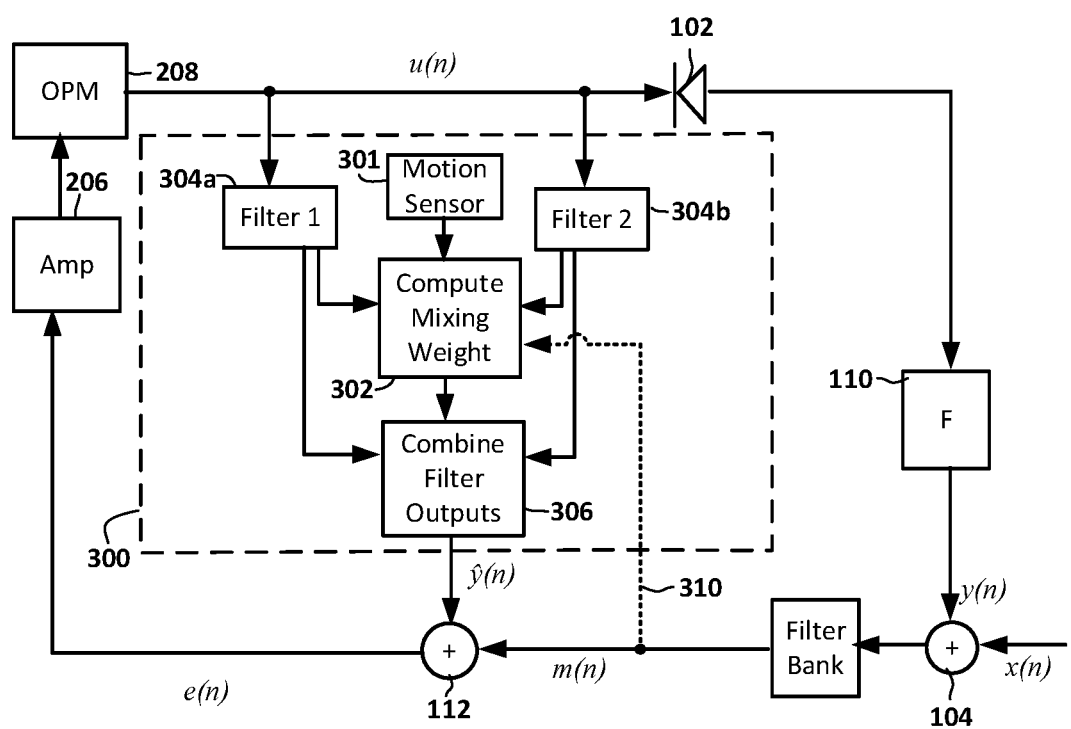
FIG. 3 is a schematic diagram of a feedback canceller according to another example embodiment.

In FIG. 3, a diagram illustrates details of a feedback cancellation circuit 300 according to another example embodiment. A signal from one or more motion sensors 301 is input to a filter mixing controller 302 that detects a current or imminent change in characteristics of the feedback path 110. As with the embodiment in FIG. 2, the filter mixing controller 302 may optionally take as input 310 an internal representation of the audio signal, which in this case is the microphone signal m(n), although the error signal e(n) or some other signal stage could be used.

In response to one or both of inputs 301, 310, the filter mixing controller 302 changes mixing weight of two adaptive filters 304a-b, the outputs of which are combined 306 to form the feedback cancellation signal ŷ(n). Generally, by adjusting the weights, the net performance of the feedback cancellation circuit 300 can be finely adjusted to compensate for varying levels of feedback path perturbation. In this example the filter mixing controller 302 may generate a continuous variable (e.g., a floating point number) that defines the ratio of filter components added to the output.

In this approach, one of the filters 304a is suited for highly dynamic feedback paths (e.g., large step size) and the other of the filters 304b suited for relatively static feedback paths (e.g., small step size). The filters 304a-b are run in parallel, and a linear or convex combination of their outputs, as a prediction of the acoustic feedback signal, is computed for feedback canceller at each time. In other words, for the feedback canceller output at time n, the output is shown in Eq. (1) below, where the mixing coefficient λ(n) determines the corresponding weight of the two filters in the FBC output.

$$\hat{y}(n) = \lambda(n)y_1(n) + (1 - \lambda(n))y_2(n) \quad (1)$$

It will be understood that the embodiments shown in FIGS. 2 and 3 are not mutually exclusive. For example, one or both of the filters 304a-b may be coupled to a mode operation functional block similar to block 202 in FIG. 2 that also receives inputs from the motion sensor together with block 302 in FIG. 3. In one configuration, modes of the one or more filters 304a-b may be changed separately or together similar to what is described in FIG. 2. This change in mode may occur together with a changing in the mixing variables as described above, or the mode changes and mixing variables may be changed independently. In such a configuration, the embodiment shown in FIG. 3 may be made to operate similarly to that shown in FIG. 2, e.g., by setting one of the mixing coefficients to zero and the other to one such that just one selected filter is used for feedback cancellation. The selected filter could change modes (e.g., step size, optimization algorithm) as described above in response to changes in the feedback path.

Feedback path changes can be placed into two general categories based on their source and cause. The first is user's direct head motion, includes feedback path changes when the users perform activities directly resulting in head motion. Examples include sitting down, standing up, shaking head, coughing, sneezing, and even chewing (as it creates jaw movements). A second category of feedback path changes involves external objects. This category includes feedback path changes when an object gets close to the ear. Examples include talking on the phone or moving the hand close to the ear, for instance, to put on a hat or taking it off.

The feedback path changes in the first category can be effectively captured using a motion sensor in the hearing device. Lab experiments with subjects indicate that even in the second category, the feedback path change is accompanied by some level of head motion in real life scenarios. As an example, when trying to talk to a mobile phone, people usually make some head motion prior to putting the phone on the ear such as looking at the phone screen. In the cases studied, some head motion happens prior to or at the same time of the actual feedback path change. In other words, feedback path changes seem to be correlated with levels of head motion. As a result, the motion sensor data can be used to switch from the slow filter in the feedback canceller (e.g., with a small step size) to the fast filter in the feedback canceller (e.g., with large step size) when considerable head motion is detected. Hence, the feedback canceller would avoid chirping or howling when there is a feedback path change while maintaining a better sound quality and gain margin when the user is still and there is no feedback path change. The feedback canceller error signals can be combined with the motion data to further improve the switching decision in the presence of speech signals and oversampled filter banks.

Figure 4:
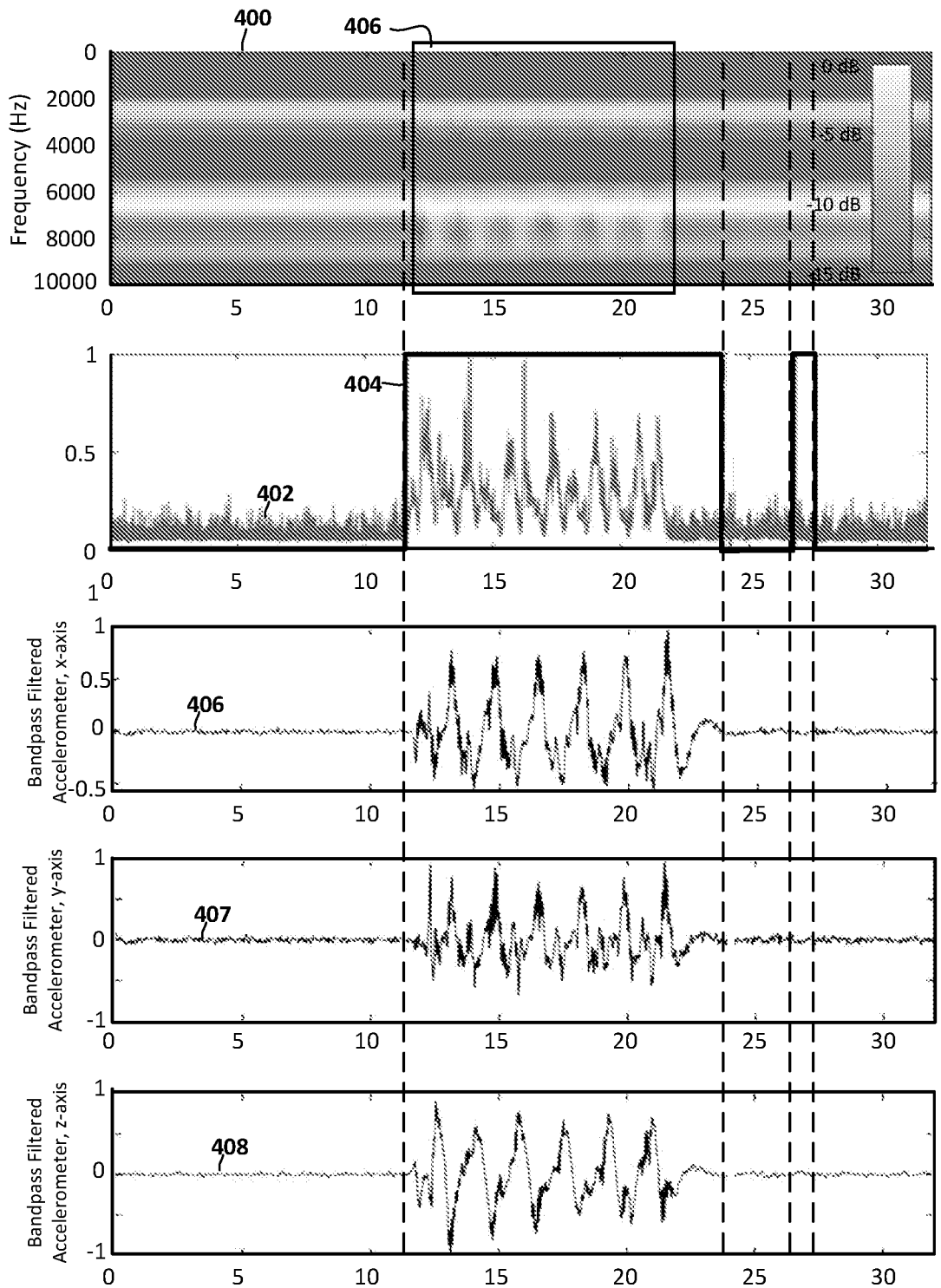
FIGS. 4 and 5 are graphs showing changes in feedback paths that can be detected by a hearing device according to an example embodiment.
Figure 5:
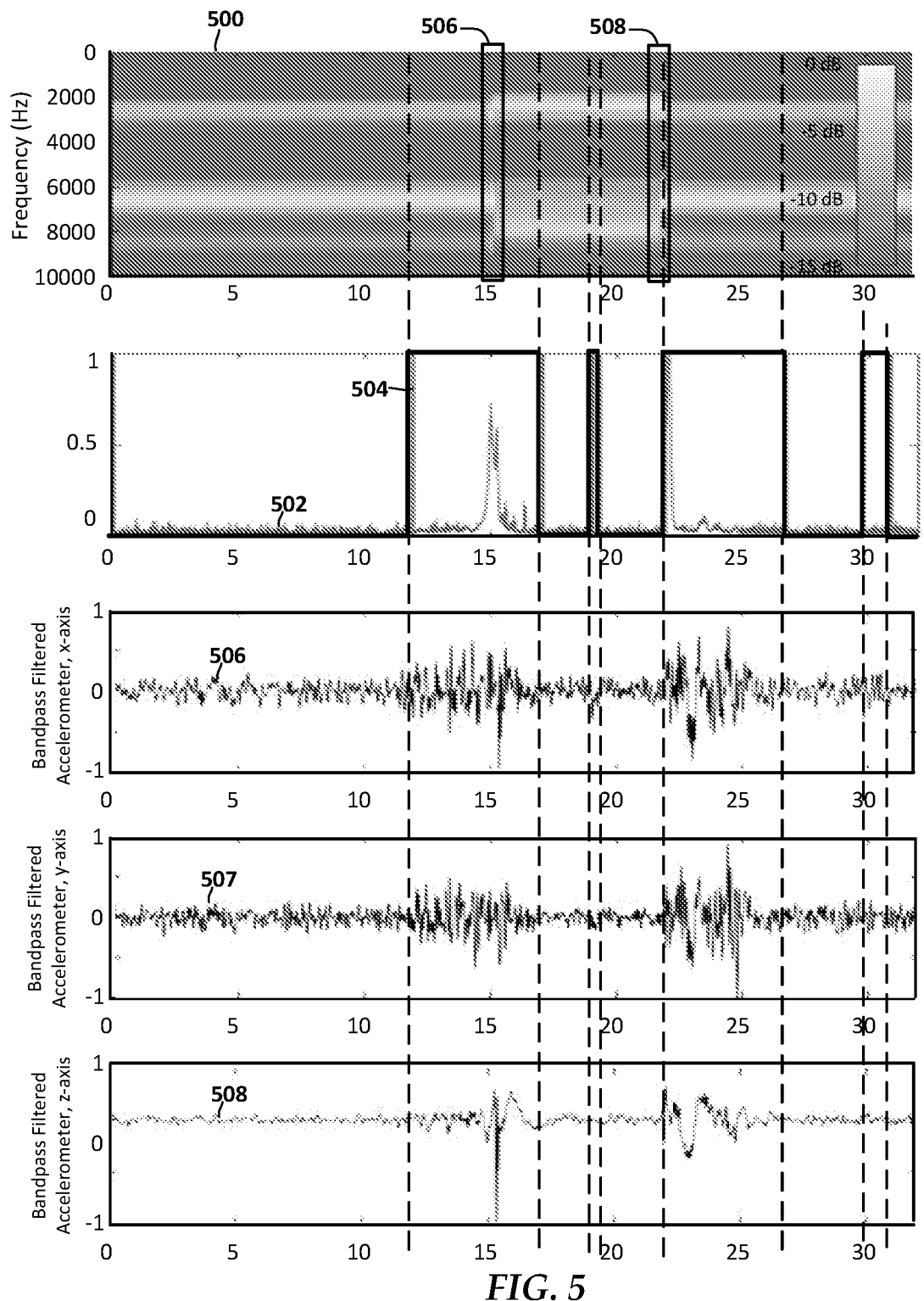

In FIGS. 4 and 5, graphs show examples that demonstrate the application of a feedback controller as described herein. In FIGS. 4 and 5, panels 400, 500 show the frequency response of the feedback path in time for a sampling rate of 20 kHz. The traces 402, 502 in the lower plots show the energy of the difference between consecutive feedback paths as a measure of feedback path change. The traces 404, 504 drawn in bold represent the calculated operation mode, which determines the step size or the feedback controller algorithm based on the motion sensor signal. The traces 406-408, 506-508 represent motion detector signals, in this case outputs of x, y, and z accelerometers. These accelerometers may be collectively part of an inertial measurement unit (IMU).

The traces 404, 504 represent binary signals used by an operational mode controller and/or filter mixer controller as in FIGS. 2 and 3. For example, if a change in the feedback path is above a first threshold, this can cause the signals 404, 405 to transition to 1, and if the change in the feedback path is below a second threshold, the signals 404, 405 transition to 0. If the signals 404, 405 are 0, the filter can use a small step size for FBC (and/or other setting that results in slower adaptation), and if the signals 404, 405 are 1, the filter can use a large step size for FBC (and/or other setting that results in faster adaptation). These binary signals 404, 504 are examples of a feedback path change signal that can be used to trigger changes in filter adaptation.

In FIG. 4, region 406 indicates a time period where the subject is shaking his/her head from left to right, thus represents a feedback change in the first category described above. In FIG. 5, regions 506, 508 are time periods in which the user moves a phone towards and away from his/her ear, and therefore represents a feedback change in the second category described above. In both FIGS. 4 and 5, the regions 406, 506, 508 fall within the periods in which traces 404 and 504 are 1, meaning that feedback path changes have been captured by the detector based on the motion sensor.

An ear-wearable device as described herein can detect significant human motion using the motion sensor, and in response, increase the FBC adaption rate when motion is detected. A bandpass filter can be applied on the raw accelerometer signals to restrict the output to human-related motions. Examples of non-human related high and low frequency sources in motion sensors include a moving vehicle and gravity, respectively. In one embodiment, an algorithm can compute the instantaneous magnitude of the band-passed accelerometer signal and threshold it beyond the resting value to detect significant motion. Note that the goal here is not necessarily to do an activity classification for users (although such classification may be performed by other functional modules) but to detect any significant motion by them.

One issue that may arise with solely using the accelerometer magnitude is that a significant change in one of the axes can be overshadowed by the resting values of other axes. Therefore, in one embodiment, a binary motion signal is computed for each of the axes individually. This could involve, for example, the binary motion signal being set to one if statistics of a time-averaged value of the band-passed accelerometer magnitude exceeds one or more thresholds. In one embodiment, whenever all binary motion signals are 0, a combined motion signal is set to 0, causing the FBC to operate at a slow adaption rate. Whenever at least one of the motion signals is 1 in this embodiment, a combined binary motion signal is set to 1 and the FBC is caused to operate at a fast adaption rate. The traces 404, 504 in FIGS. 4 and 5 represent an example of a combined motion signal that may be obtained this way.

In one embodiment, the algorithm may monitor the value and the variance of the band-passed accelerometer signals in each axes over time, and based on their resting (no human motion) value, sets the binary motion signal equal to 0 or 1.

Figure 6A:
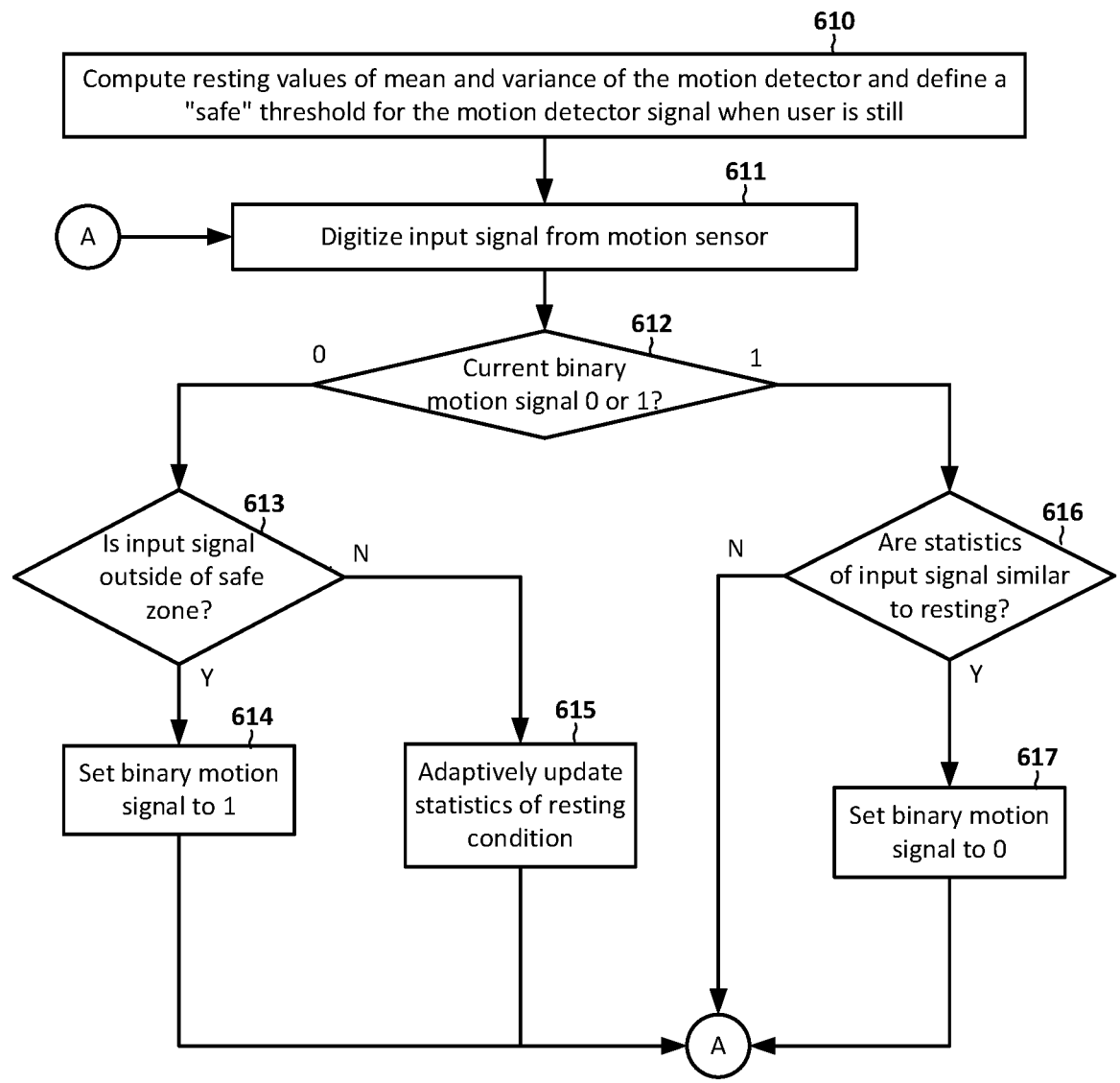
FIG. 6A is a flowchart showing a motion sensor monitoring algorithm according to an example embodiment.

The algorithm for an example motion sensing algorithm is shown in the flowchart of FIG. 6A. The algorithm involves computing 610 resting values (no human motion) of mean and variance of the motion detector (e.g., accelerometer) and defines a "safe" interval for the motion detector signal accordingly when user is still. The input signal from the motion sensor is digitized 611 in an operational processing loop. Block 612 determines the current setting of the binary motion signal, branching to the left if it is '0' and to the right if it is '1.' If the current value of the binary motion signal is '0,' a determination 613 is made as to whether the input value digitized at block 611 is outside the safe zone. For example, this may involve metrics of the input signal digitized at block 611 crossing a first threshold. If outside the safe zone, the binary motion signal is set 614 to '1,' otherwise the statistics of the resting condition are updated 615. Block 615 can be used to continuously update the thresholds or other characteristics used to define the safe zone.

If block 612 indicates that the current value of the binary motion signal is '1,' a determination 616 is made as to whether the statistics of the input value digitized at block 611 is similar to corresponding resting values measured at block 610. For example, the statistics of the input value may include a variance of the input values, and the resting values may be defined by a variance threshold below which it may be assumed there is little or no change in the feedback path. In another example, if a difference between the statistics of the input values and the resting statistics are less than a threshold, then it may be assumed there is little or no change in the feedback path. If block 616 returns 'yes,' the binary motion signal is set 617 to '0.' If block 616 returns 'no,' control returns to block 611 to process the next portion of the motion sensor signal. Control also returns to block 611 after completion of any of blocks 614, 615, and 617.

The algorithm shown in FIG. 6A recognizes that human-related motions are correlated with the variance of accelerometer signals seen in traces 406-408, 506-508 of FIGS. 4 and 5. To make sure significant chirping does not occur, a fast adaption in the FBC filter may be used as soon as the accelerometer signals go beyond their safe resting zones. Thus, in one embodiment, block 613 will return 'yes' as soon as the motion is detected. Also, when switching back to slow adaption (block 616 returns 'yes') a variance over time can be one of the statistics computed in block 616 to slow down the transition to the motion signal '0' state. This can avoid potential chirpings due to intermittent pauses in the feedback-path-altering activities.

In FIG. 6B, a diagram shows a technique that may be used to change FBC adaptation based on motion detection to according to another example embodiment. As seen in this diagram, discrete time motion signals 620 are received from an IMU, each corresponding to one of the three orthogonal axes of movement. Note that the signals 620 may include fewer than the three axis signals, e.g., two or one.

A decoder 622 learns a mapping (linear or non-linear) from the current and previous samples of the motion signals 620 over time interval 626 to predict the current status of the feedback path change. Once the mapping is learned, it is applied as data of motion signals 620 come in to see if the feedback path is changing or not. The decoder 622 generates (see arrow 623) a feedback path change signal 624 that can be used to modify the adaptive filter as discussed above. The feedback path change signal 624, which is what the decoder is trying to predict, can either be a binary decision variable (e.g., 0 when no FB path change or 1 when FB path change happens) or it can be some other metric of the FB path change. For instance, the feedback path change signal 624 may be data indicative of energy differences between consecutive feedback path measurements.

The mapping used by the decoder 622 is learned on data in which full information of feedback path changes is known, e.g., training data. The interval 626 of data input to the decoder 622 from signals 620 may be predetermined changed based on training results. The interval 626 may be dynamically adaptable for different conditions of use. Generally, a smaller interval 626 may result in a simpler decoder that uses fewer resources, while a larger interval 626 may provide better results under some conditions. The decoder 622 may use any decoding algorithm known in the art, such as neural networks, Hidden Markov Models, etc.

Note that the decoder 622 can be readily adapted to include other features described above as inputs, including using an acoustic feature (e.g., error signal) of the digitized audio input signal in combination with smoothed magnitude for changing the filter adaptation. For example, the decoder may take as inputs digitized acoustic features (e.g., error signal) and make a joint determination of feedback path change signal 624 based on all the factors input to the decoder 622 and not just the IMU signals 620.

In FIG. 6C, a table 630 shows an algorithm that can be used to change FBC adaptation based on motion detection to according to another example embodiment. Generally, the algorithm in the table 630 takes the real time signal of the IMU from all three axes, which is input vector s(t) for the current sampling time. Note that in some embodiments, the vector s(t) may include fewer than the three axis components, e.g., two or one. At line 1 in table 630, a bandpass filter is applied to s(t) to obtain $s_B(t)$. The bandpass filter is selected to emphasize natural movements of the user. A bandpass filter of [1,15] Hz is typically sufficient for this purpose, although other cutoff frequencies can be used. The magnitude m(t) of $s_B(t)$ is also found at line 1, where m(t)=|$s_B(t)$|.

During the course of a head movement, the IMU magnitude m(t) fluctuates significantly, and thus an asymmetric smoothing operation is applied as shown in lines 3-7 of the table 630. At line 4, if the current magnitude m(t) is greater than the previous smoothed value at the previous sampling time step, $m_S(t-1)$, then the smoothed value for the current time $m_S(t)$ is set to $m_S(t-1)$ plus difference between m(t) and $m_S(t-1)$, the difference being weighted by smoothing coefficient $\kappa_R$. Otherwise, if the current magnitude m(t) is not greater than the smoothed magnitude value at the previous sampling time step, a similar operation is used at line 6 to set the smoothed magnitude value $m_S(t)$ for the current time, except coefficient $\kappa_F$ is applied to the difference (m(t)−$m_S$(t−1)) instead of $\kappa_R$.

At lines 8-11, the feedback path change signal is generated based on the current smoothed magnitude $m_S(t)$ exceeding threshold $T_0$, which will change adaptive filter step size if true. The algorithm can alternatively or additionally make other filter changes noted above in response to the determination at line 8, e.g., using different optimization algorithms, changing mixing weights for multiple adaptive filters.

The smoothing is asymmetric assuming $\kappa_R \neq \kappa_F$, and in particular $\kappa_R > \kappa_F$, as the smoothed value will change slower or faster depending on whether IMU signal magnitude is increasing or decreasing. The reason for an asymmetric smoothing operation here is to reflect the different risks for step size adjustment in AFC. In practice, the risk of keeping a small step size when strong acceleration occurs is typically high as the potential chirping and howling artifacts can be harmful and uncomfortable. However, the risk of keeping a large step size when strong acceleration is vanishing is typically small as it just causes a delay in experiencing the better sound quality corresponding to a low steady-state error. Thus, in some embodiments, a large $\kappa_R=1$ (small smoothing time constant) can be used for magnitude rises and a small $\kappa_F$ (large smoothing time constant) can be used when magnitude is decreasing.

Note that the algorithm shown in table 630 can be readily adapted to include other features described above, including using an acoustic feature (e.g., error signal) of the digitized audio input signal in combination with smoothed magnitude for changing the filter adaptation. For example, a function exceeds_threshold ($m_S(t)$, $T_0$, $a_1$, $a_2$, . . . ) can be used at line 8, wherein $a_1$, $a_2$, . . . are additional acoustic features, feature thresholds, or other inputs described herein. The function will make a joint determination based on all the factors input to the function and not just the smoothed magnitude.

Figure 6D:
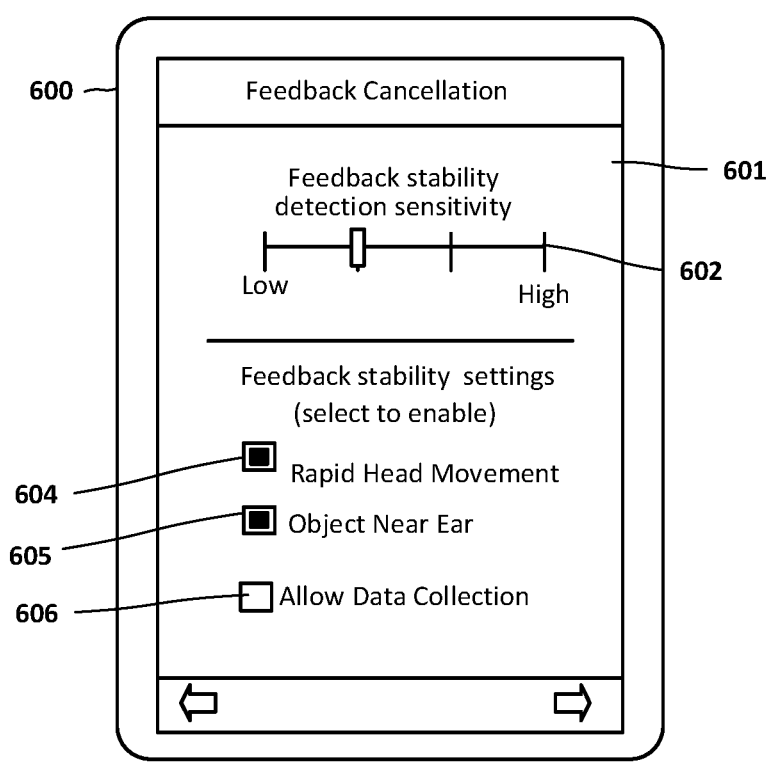
FIG. 6D is a diagram of a user interface usable for setting feedback cancelling settings according to an example embodiment.

In FIG. 6D, a diagram illustrates a user interface 601 that may be used with a hearing device according to an example embodiment. This user interface 601 may be deployed on an application operating on a smartphone 600 or similar device. The application may be connected to the hearing devices (e.g., via a wireless connection such as Bluetooth), allowing users to set feedback cancellation parameters in real-time and in real-world. In this way, the user can rate the score of listening experience in terms of sound quality, the frequency of sound chirping, the severity of chirping due to physical movement, etc. The application can record these data and corresponding trained model number, combining with time stamps, GPS locations, acoustic environment classification labels, etc. This information will enable the audiologist or the hearing device manufacturer to identify detections models and parameters that fits goals for selected individuals.

In FIG. 6D, the user interface 601 includes a slider 602 that can be used to set a threshold used by the update filter. For example, as seen in FIGS. 4 and 5, the operational modes (e.g., as set by a mode controller 202 shown in FIG. 2) may be set using binary control values of '0' or '1.' The setting of the slider 602 in FIG. 6D can affect how aggressively the modes transition between these values. In another embodiment such as shown in FIG. 3 where two filters 304a-b and mixing controller 302 are used, the slider 602 in FIG. 6D can be used to adjust the weighting to favor one or the other filters 304a-b.

The user interface 601 is also shown with selection buttons 604, 605 that allow selecting which categories of feedback variance are used for cancellation. Button 604 is associated with the first category as shown in FIG. 4 and button 605 is associated with the second category as shown in FIG. 5. In this example, the buttons 604, 605 can be enabled and disabled independently. Additional buttons could be added if additional categories are added.

Because lab testing of devices is necessarily limited in the number of subjects tested, it may be useful to gather data on fielded units as to the effectiveness of the feedback cancellation embodiments described herein. Accordingly, a control such as selection button 606 may allow the user to consent to gathering of data on fielded units. Such data may include sequences of accelerometer data, filter data, and feedback cancellation mode/mixing data. This data can be used to fine tune models and filters, and may also be used to discover other categories of feedback-inducing patterns of motion, which can be added to the existing categories such as shown in FIGS. 4 and 5. Further, this data can be used to personalize the feedback detection algorithms for each user. For example, people may tend to use move their heads differently when using a phone, and the motion detection algorithms can be optimized based on user-specific data.

Figure 7A:
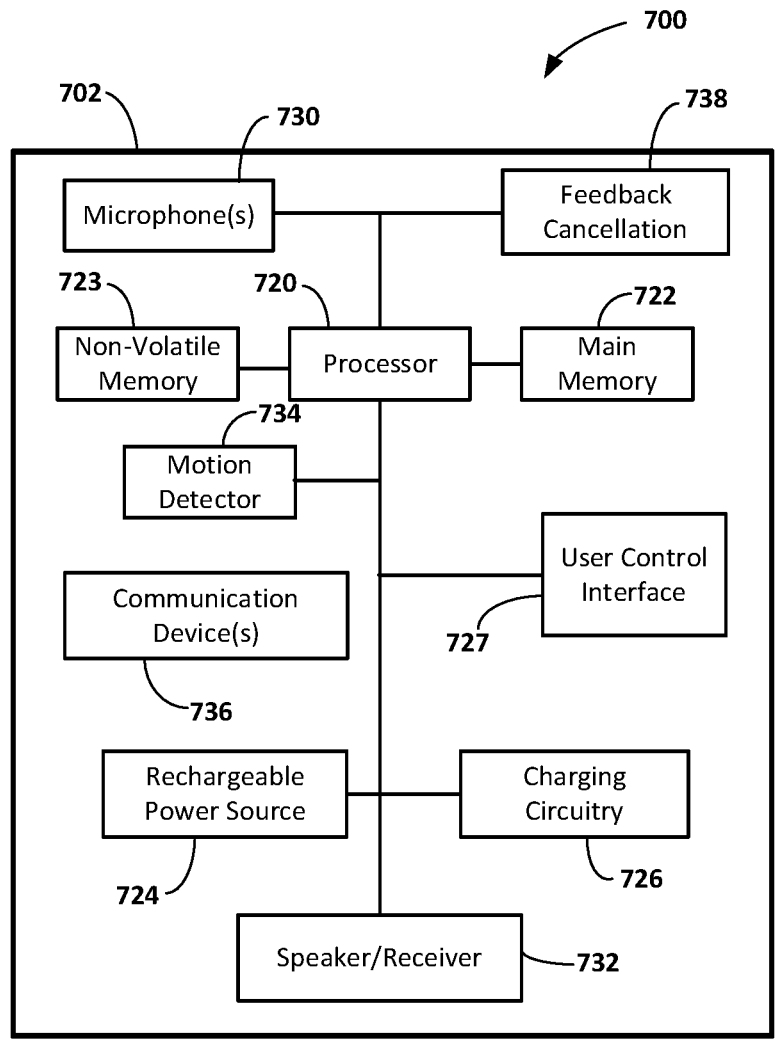
FIG. 7A is a block diagram of a hearing device according to an example embodiment.

In FIG. 7A, a block diagram illustrates an ear-worn electronic device 700 in accordance with any of the embodiments disclosed herein. The hearing device 700 includes a housing 702 configured to be worn in, on, or about an ear of a wearer. The hearing device 700 shown in FIG. 7A can represent a single hearing device configured for monaural or single-ear operation or one of a pair of hearing devices configured for binaural or dual-ear operation. The hearing device 700 shown in FIG. 7A includes a housing 702 within or on which various components are situated or supported. The housing 702 can be configured for deployment on a wearer's ear (e.g., a behind-the-ear device housing), within an ear canal of the wearer's ear (e.g., an in-the-ear, in-the-canal, invisible-in-canal, or completely-in-the-canal device housing) or both on and in a wearer's ear (e.g., a receiver-in-canal or receiver-in-the-ear device housing).

The hearing device 700 includes a processor 720 operatively coupled to a main memory 722 and a non-volatile memory 723. The processor 720 can be implemented as one or more of a multi-core processor, a digital signal processor (DSP), a microprocessor, a programmable controller, a general-purpose computer, a special-purpose computer, a hardware controller, a software controller, a combined hardware and software device, such as a programmable logic controller, and a programmable logic device (e.g., FPGA, ASIC). The processor 720 can include or be operatively coupled to main memory 722, such as RAM (e.g., DRAM, SRAM). The processor 720 can include or be operatively coupled to non-volatile memory 723, such as ROM, EPROM, EEPROM or flash memory. As will be described in detail hereinbelow, the non-volatile memory 723 is configured to store instructions that facilitate using a motion detection signals to change the operation of a feedback cancellation filter.

The hearing device 700 includes an audio processing facility operably coupled to, or incorporating, the processor 720. The audio processing facility includes audio signal processing circuitry (e.g., analog front-end, analog-to-digital converter, digital-to-analog converter, DSP, and various analog and digital filters), a microphone arrangement 730, and a speaker or receiver 732. The microphone arrangement 730 can include one or more discrete microphones or a microphone array(s) (e.g., configured for microphone array beamforming). Each of the microphones of the microphone arrangement 730 can be situated at different locations of the housing 702. It is understood that the term microphone used herein can refer to a single microphone or multiple microphones unless specified otherwise.

The hearing device 700 may also include a user interface with a user control interface 727 operatively coupled to the processor 720. The user control interface 727 is configured to receive an input from the wearer of the hearing device 700. The input from the wearer can be any type of user input, such as a touch input, a gesture input, or a voice input. The user control interface 727 may be configured to receive an input from the wearer of the hearing device 700 to change feedback cancellation parameters of the hearing device 700, such as shown in FIG. 6D. The user control interface 727 may also be used to enable or disable automatic settings changes to the feedback cancellation filter.

The hearing device 700 also includes a feedback cancellation module 738 operably coupled to the processor 720. The feedback cancellation module 738 can be implemented in software, hardware, or a combination of hardware and software. The feedback cancellation module 738 can be a component of, or integral to, the processor 720 or another processor (e.g., a DSP) coupled to the processor 720. The feedback cancellation module 738 is configured to detect and cancel feedback in different types of acoustic environments.

According to various embodiments, the feedback cancellation module 738 includes one or more adaptive filters that insert a feedback cancellation signal into a digitized input signal to produce an error signal. The feedback cancellation module 738 includes or is coupled to a mode selector and/or a filter mixing weight selector that alters the filtering applied to the feedback cancellation signal. A motion detector 734 provides a motion signal indicative of motion of the hearing device 700. For example, the motion detector 734 may include a 3-axis IMU. The mode selector and/or a filter mixing weight selector determines a change in a feedback path based on the motion signal and possibly the internal signals of the feedback cancellation module, causing the one or more adaptive filters to have a faster adaptation to feedback perturbations compared to a previously used mode.

The hearing device 700 can include one or more communication devices 736 coupled to one or more antenna arrangements. For example, the one or more communication devices 736 can include one or more radios that conform to an IEEE 802.11 (e.g., WiFi®) or Bluetooth® (e.g., BLE, Bluetooth® 4.2, 5.0, 5.1, 5.2 or later) specification, for example. In addition, or alternatively, the hearing device 700 can include a near-field magnetic induction (NFMI) sensor (e.g., an NFMI transceiver coupled to a magnetic antenna) for effecting short-range communications (e.g., ear-to-ear communications, ear-to-kiosk communications).

The hearing device 700 also includes a power source, which can be a conventional battery, a rechargeable battery (e.g., a lithium-ion battery), or a power source comprising a supercapacitor. In the embodiment shown in FIG. 5, the hearing device 700 includes a rechargeable power source 724 which is operably coupled to power management circuitry for supplying power to various components of the hearing device 700. The rechargeable power source 724 is coupled to charging circuity 726. The charging circuitry 726 is electrically coupled to charging contacts on the housing 702 which are configured to electrically couple to corresponding charging contacts of a charging unit when the hearing device 700 is placed in the charging unit.

Figure 7B:
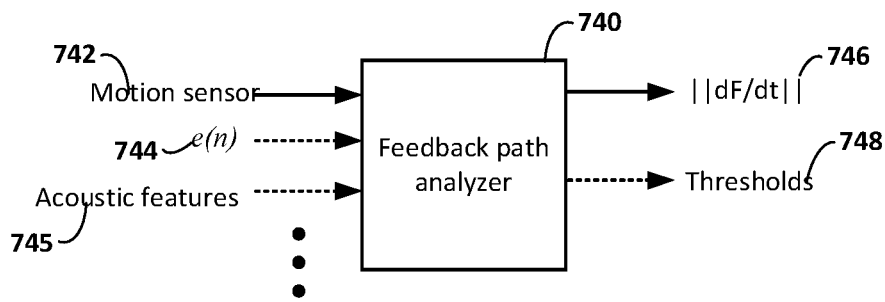
FIG. 7B is a block diagram showing a feedback path analyzer block according to an example embodiment.

In some embodiments described below, a hearing device will attempt to determine when the device is experiencing a change in feedback path. The device may not be able to measure feedback path directly, but can estimate such changes via indicators such as motion sensor signal and statistics of the audio signal. In FIG. 7B, block 740 represents a computation block that may be used to indirectly estimate feedback path changes, which is designated here as dF/dt, even though it may be estimated in the frequency domain. Note that FIG. 7B is presented for purposes of illustration, and systems, devices, and methods described herein may provide analogous functionality without using an express representation of feedback path change or thresholds.

Motion sensor data 742 is input to the block 740, and optionally other data such as error signal e(n) 744, acoustic features 745, etc. The block outputs an estimate 746 of the magnitude of the change in feedback path. For purposes of illustration, this estimate 746 may be a single number, e.g., a positive number scaled from 0.0 to 1.0 indicating a stable feedback path at 0.0 to a maximum change in path at 1.0. The block 740 may also output one or more thresholds 748 that output 746 may be compared against for purposes of triggering various events, such as increasing or decreasing the adaptation rate of the FBC filter. The block 740 may use any type of algorithm, and may be adaptive, such that the thresholds 748 may be adaptively changed over time based on ambient conditions, for example.

Figure 8:
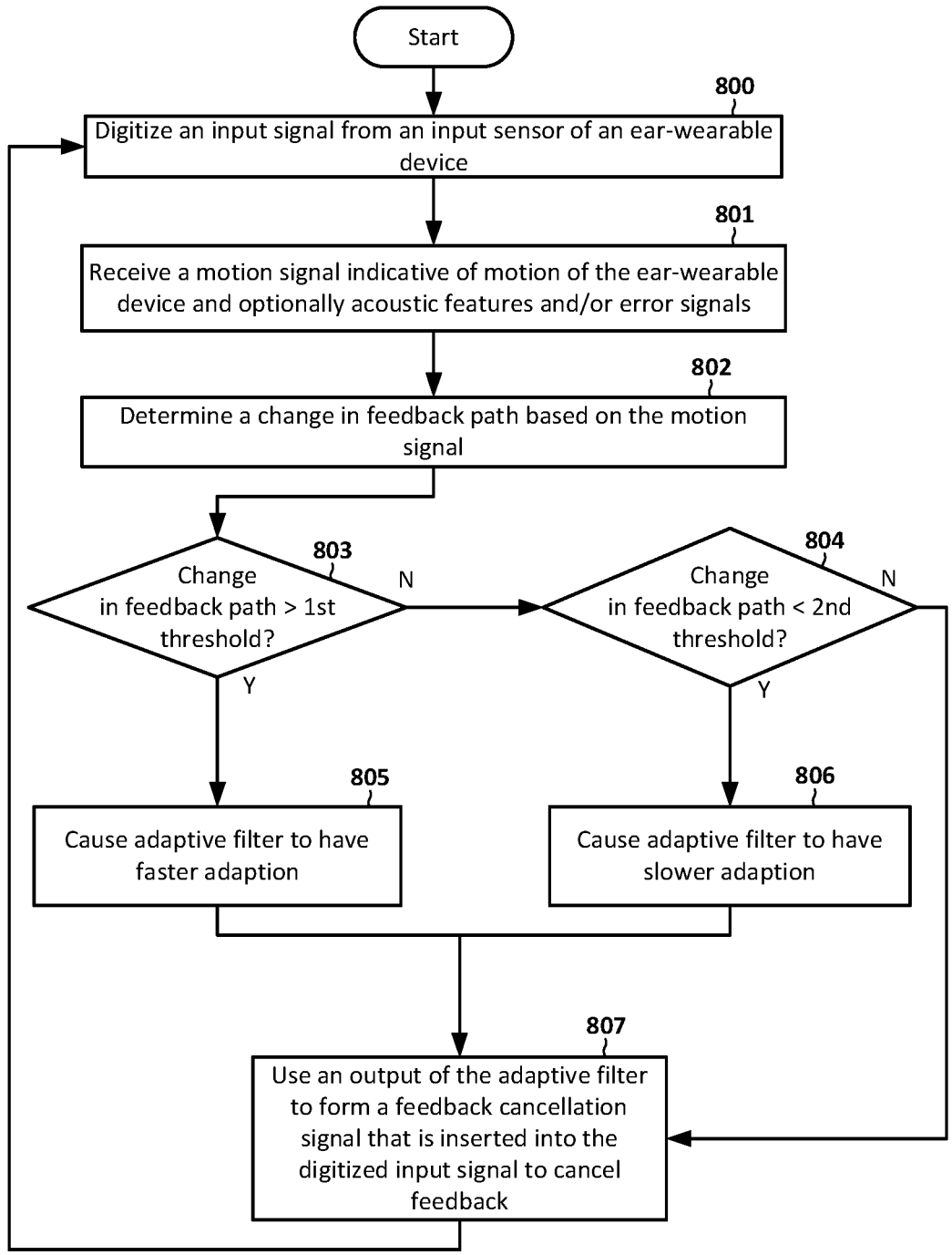
FIGS. 8-10 are flowcharts of methods according to example embodiments.
Figure 9:
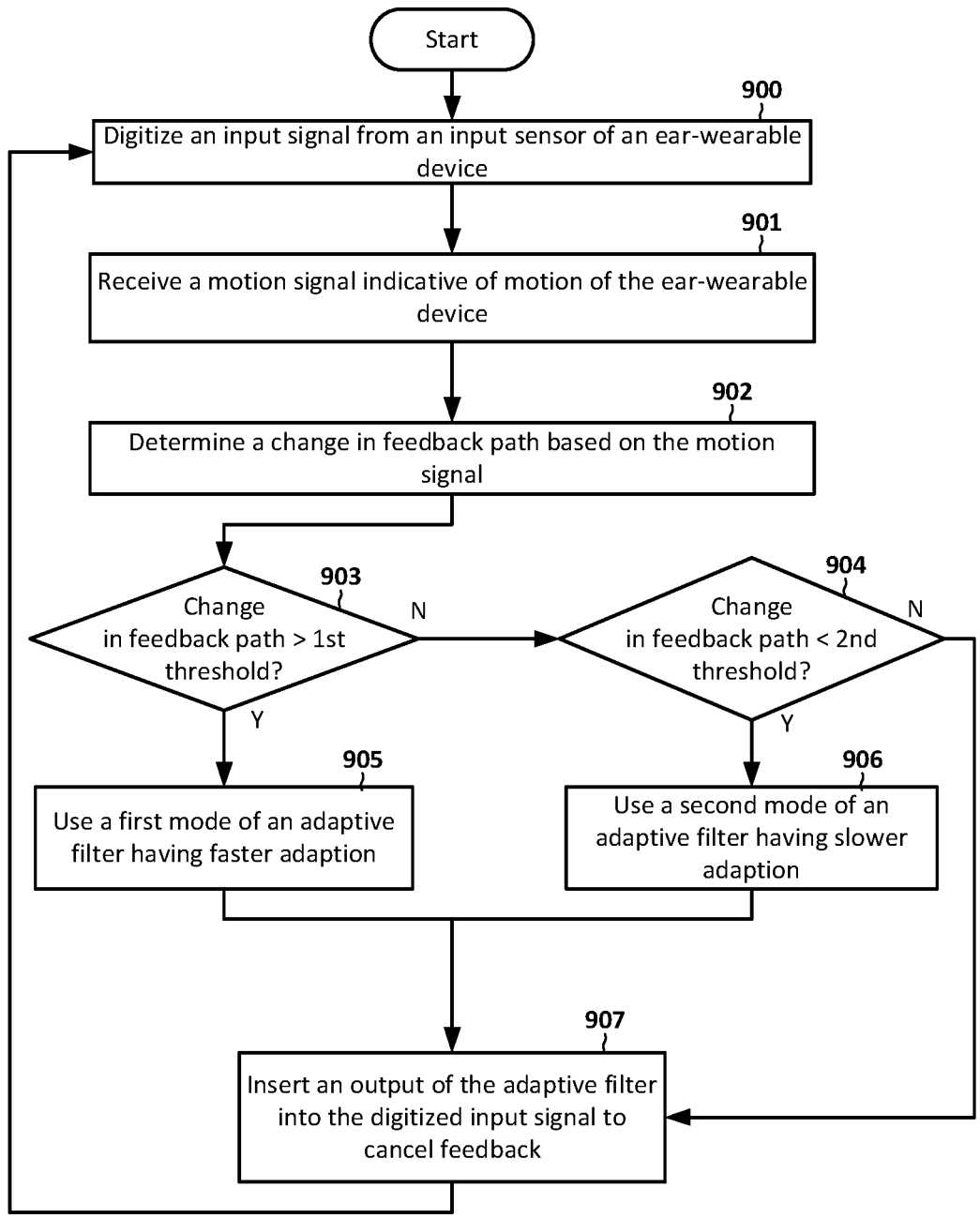
Figure 10:
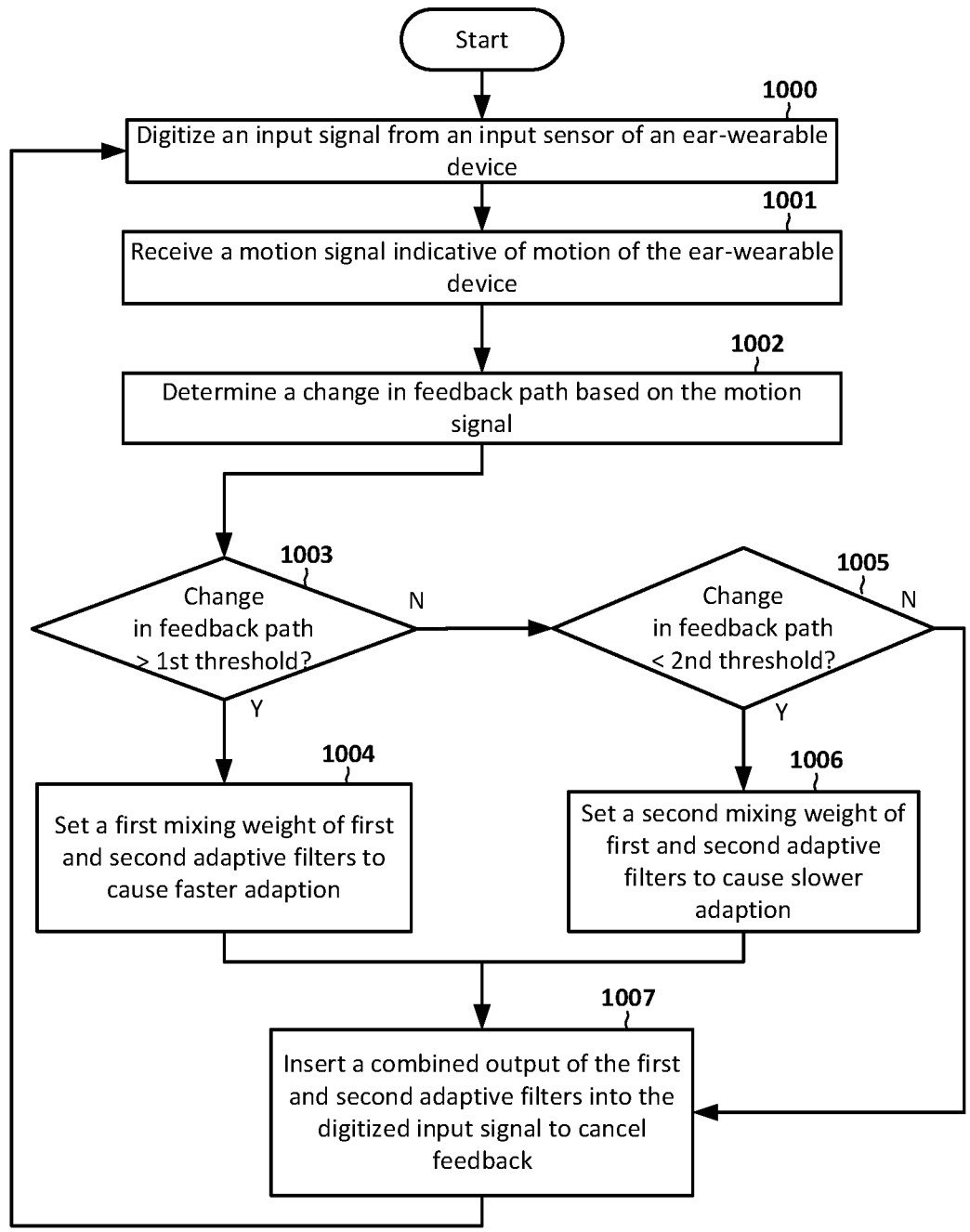

In FIGS. 8-10, flowcharts show methods according to example embodiments. Generally, the methods can be implemented within an infinite loop in a hearing device. As shown in FIG. 8, a method involves digitizing 800 an input signal from an input sensor of an ear-wearable device. A motion signal indicative of motion of the ear-wearable device is received 801. A change in a feedback path is determined 802 (e.g., detected, estimated, predicted) based on the motion signal and optionally based on internal signals of the FBC module such as acoustic features and error signal. If it is determined 803 that the change in the feedback path is above a first threshold, then an adaptive filter is caused 805 to have faster adaption in response. If it is determined 804 that the change in the feedback path is below a second threshold, then, the adaptive filter is caused 806 to have slower adaption in response. An output of the adaptive filter is used 807 to form a feedback cancellation signal that is inserted into the digitized input signal to cancel feedback. Note that the first and second thresholds may be the same or different, and the thresholds may change over time.

As shown in FIG. 9, a method involves digitizing 900 an input signal from an input sensor of an ear-wearable device. A motion signal indicative of motion of the ear-wearable device is received 901. A change in a feedback path is determined 902 (e.g., detected, estimated, predicted) based on the motion signal and optionally based on internal signals of the FBC module such as acoustic features and error signal. If it is determined 903 that the change in the feedback path is above a first threshold, then a first mode of an adaptive filter is used 905 in response. The adaptive filter has a faster adaptation to feedback perturbations in the first mode compared to a second mode. If it is determined 904 that the change in the feedback path is below a second threshold, then, a second mode of the adaptive filter is used 906. An output of the adaptive filter is inserted 907 t into the digitized input signal to cancel feedback.

As shown in FIG. 10, a method involves digitizing 1000 an input signal from an input sensor of an ear-wearable device. A motion signal indicative of motion of the ear-wearable device is received 1001. A change in a feedback path is determined 1002 (e.g., detected, estimated, predicted) based on the motion signal and optionally based on internal signals of the FBC module such as acoustic features and error signal. If it is determined 1003 that the change in the feedback path is above a first threshold, then a first mixing weight of the first and second adaptive filters is set 1004 in response. The first mixing weight causes the combined output of the first and second adaptive filters to have a faster adaptation to feedback perturbations compared to a second mixing weight. If it is determined 1005 that the change in the feedback path is below a second threshold, then, the second mixing weight is set 1006 in response. A combined output of the first and second adaptive filters is inserted 1004 into the digitized input signal to cancel feedback.

This document discloses numerous embodiments, including but not limited to the following:

Embodiment 1 is an ear-wearable device, comprising: an input sensor that provides an audio input signal, the audio input signal being digitized via circuitry of the ear-wearable device; an adaptive feedback canceller comprising an adaptive filter producing an output that is inserted into the digitized audio input signal to cancel feedback; a motion detector providing a motion signal indicative of motion of the ear-wearable device; and a processor operable to determine a change in a feedback path based on the motion signal, the processor causing the adaptive filter to have faster adaption in response to the change in the feedback path is above a first threshold, the processor causing the adaptive filter to have slower adaption in response to the change in the feedback path being below a second threshold.

Embodiment 2 includes the ear-wearable device of embodiment 1, wherein the motion detector comprises one or more accelerometers. Embodiment 3 includes the ear-wearable device of embodiment 1 or 2, wherein the motion signal indicates a rapid motion of the head a wearer of the ear-wearable device. Embodiment 4 includes the ear-wearable device of embodiments 1 or 2, wherein the motion signal indicates that a wearer of the ear-wearable device is or will be moving an object in proximity to the ear-wearable device, the movement of the object affecting the feedback path.

Embodiment 5 includes the ear-wearable device of any of embodiments 1-4, wherein causing the adaptive filter to have faster adaption comprises setting a first mode of the adaptive filter, and wherein causing the adaptive filter to have slower adaption in response to determining the change in the feedback path is below the second threshold comprises setting a second mode of the adaptive filter. Embodiment 6 includes the ear-wearable device of embodiment 5, wherein the adaptive filter uses different step sizes in the first and second modes. Embodiment 7 includes the ear-wearable device of embodiment 6, wherein the first mode uses a larger step size than the second mode.

Embodiment 8 includes the ear-wearable device of any of embodiments 5-7, wherein the adaptive filter uses different optimization algorithms in the first and second modes. Embodiment 9 includes the ear-wearable device of embodiment 8, wherein to the first mode uses a least square algorithm (NLMS) mode and the second mode uses a sign-normalized NLMS mode.

Embodiment 10 includes the ear-wearable device of any of embodiments 1-4, wherein the adaptive feedback canceller comprises a second adaptive filter, a first output of the adaptive filter being combined with a second output of the second adaptive filter to form the feedback cancellation signal, and wherein causing the adaptive filter to have faster adaption comprises using a first mixing weight when combining the first and second outputs and wherein causing the adaptive filter to have slower adaption comprises using a second mixing weight when combining the first and second outputs.

Embodiment 11 includes the ear-wearable device of any of embodiments 1-10, wherein the processor determines the change in the feedback path based on a combination of the motion signal and an acoustic feature of the digitized audio input signal. Embodiment 12 includes the ear-wearable device of any of embodiments 1-11, wherein the processor determines the change in the feedback path based on a combination of the motion signal and an error signal, the error signal formed by inserting the output of the adaptive filter into the digitized audio input signal. Embodiment 13 includes the ear-wearable device of any of embodiments 1-12, wherein causing the adaptive filter to have slower adaption in response to the change in the feedback path being below the second threshold comprises measuring statistics of the motion signal over time, wherein the feedback path is below the second threshold if the statistics are similar to corresponding resting statistics measured at rest.

Embodiment 14 includes the ear-wearable device of embodiment 13, wherein the resting statistics are adaptively updated when the change in the feedback path being is below the second threshold. Embodiment 15 includes the ear-wearable device of any of embodiments 1-14, wherein the first and second thresholds are the same. Embodiment 16 includes the ear-wearable device of any of embodiments 1-15, wherein one or both of the first and second thresholds are adaptively updated over time based on ambient conditions.

Embodiment 16A includes ear-wearable device of any of embodiments 1-16, wherein determining the change in the feedback path based on the motion signal comprises inputting the motion signal into a decoder, the decoder configured via training data to map the motion signal to the change in the feedback path. Embodiment 16B includes the ear-wearable device of embodiment 16A, wherein the motion signal comprises three signals corresponding to three orthogonal axes of movement, the three signals being input to the decoder. Embodiment 16C includes the ear-wearable device of embodiment 16A or 16B, wherein the motion signal comprises current and previous samples of the motion signal over a time interval.

Embodiment 16D includes the ear-wearable device of any of embodiments 1-16, wherein determining the change in the feedback path based on the motion signal comprises: determining a current magnitude of the motion signal for a current sampling time step; and determining an asymmetrically smoothed magnitude based on the current magnitude and a previous smoothed magnitude, the change in the feedback path being determined if the smoothed magnitude satisfies a threshold. Embodiment 16E includes the ear-wearable device of embodiment 16D, wherein motion signal is bandpass filtered before the current magnitude of the motion signal is determined, the bandpass filter emphasizing natural movements of the user. Embodiment 16F includes the ear-wearable device of embodiment 16D or 16E, wherein the asymmetric smoothed magnitude changes by a first coefficient $\kappa_R$ when the current magnitude of the motion signal is increasing compared to the previous smoothed magnitude and a second coefficient $\kappa_R$ when the current magnitude of the motion signal is decreasing compared to the previous smoothed magnitude, wherein $\kappa_R$>variac.

Embodiment 17 is an ear-wearable device, comprising: an input sensor that provides an audio input signal, the audio input signal being digitized via circuitry of the ear-wearable device; an adaptive feedback canceller comprising an adaptive filter having an output that is inserted into the digitized audio input signal to cancel feedback; a motion detector providing a motion signal indicative of motion of the ear-wearable device; and a mode controller configured to determine a change in a feedback path based on the motion signal, the mode controller setting a first mode of the adaptive filter in response to determining the change in the feedback path exceeding a first threshold, the adaptive filter having a faster adaptation to feedback perturbations in the first mode compared to a second mode, the mode controller further setting the second mode of the adaptive filter if the change in the feedback path is below a second threshold.

Embodiment 18 includes the ear-wearable device of embodiment 17, wherein the motion detector comprises one or more accelerometers. Embodiment 19 includes the ear-wearable device of embodiment 17 or 18, wherein the motion signal indicates a rapid motion of the head a wearer of the ear-wearable device. Embodiment 20 includes the ear-wearable device of embodiment 17 or 18, wherein the motion signal indicates that a wearer of the ear-wearable device is or will be moving an object in proximity to the ear-wearable device, the movement of the object affecting the feedback path.

Embodiment 21 includes the ear-wearable device of any of embodiments 17-20, wherein the adaptive filter uses different step sizes in the first and second modes. Embodiment 22 includes the ear-wearable device of embodiment 21, wherein the first mode uses a larger step size than the second mode. Embodiment 23 includes the ear-wearable device of any of embodiments 17-22, wherein the adaptive filter uses different optimization algorithms in the first and second modes. Embodiment 24 includes the ear-wearable device of embodiment 23, wherein to the first mode uses a least square algorithm (NLMS) mode and the second mode uses a sign-normalized NLMS mode.

Embodiment 25 includes the ear-wearable device of any of embodiments 17-20, wherein the adaptive feedback canceller comprises a second adaptive filter, a first output of the adaptive filter being combined with a second output of the second adaptive filter to form the feedback cancellation signal, and wherein a mixing weight applied to the adaptive filter and the second adaptive filter is changed in response to determining the change in the feedback path exceeds the first threshold.

Embodiment 26 includes the ear-wearable device of any of embodiments 17-25, wherein the mode controller determines the change in the feedback path based on a combination of the motion signal and an acoustic feature of the digitized audio input signal. Embodiment 27 includes the ear-wearable device of any of embodiments 17-26, wherein the mode controller determines the change in the feedback path based on a combination of the motion signal and an error signal, the error signal formed by inserting the output of the adaptive filter into the digitized audio input signal. Embodiment 28 includes the ear-wearable device of any of embodiments 17-27, wherein the first and second threshold are the same.

Embodiment 29 is an ear-wearable device, comprising: an input sensor that provides an audio input signal, the audio input signal being digitized via circuitry of the ear-wearable device; an adaptive feedback canceller comprising a first and second adaptive filters whose output is combined to form a combined output that is inserted into the digitized audio input signal to cancel feedback; a motion detector providing a motion signal indicative of motion of the ear-wearable device; and a filter mixing controller configured to determine a change in a feedback path based on the motion signal, the filter mixing controller setting a first mixing weight of the first and second adaptive filters in response to the change in the feedback path exceeding a first threshold, the first mixing weight causing the combined output of the first and second adaptive filters to have a faster adaptation to feedback perturbations compared to a second mixing weight, the filter mixing controller setting the second mixing weight in response to the change in the feedback path being below a second threshold.

Embodiment 30 includes the ear-wearable device of embodiment 29, wherein the motion detector comprises one or more accelerometers. Embodiment 31 includes the ear-wearable device of embodiment 29 or 30, wherein the motion signal indicates a rapid motion of the head a wearer of the ear-wearable device. Embodiment 32 includes the ear-wearable device of embodiment 29 or 30, wherein the motion signal indicates that a wearer of the ear-wearable device is or will be moving an object in proximity to the ear-wearable device, the movement of the object affecting the feedback path. Embodiment 33 includes the ear-wearable device of any of embodiments 29-32, wherein the filter mixing controller determines the change in a feedback path based on a combination of the motion signal and an acoustic feature of the digitized audio input signal. Embodiment 34 includes the ear-wearable device of any of embodiments 29-33, wherein the filter mixing controller determines the change in a feedback path based on a combination of the motion signal and an error signal, the error signal formed by inserting the output of the adaptive filter into the audio input signal. Embodiment 35 includes the ear-wearable device of any of embodiments 29-34, wherein the first and second threshold are the same.

Embodiment 36 is a method comprising: digitizing an audio input signal from an input sensor of an ear-wearable device; receiving a motion signal indicative of motion of the ear-wearable device; detecting a change in a feedback path based on the motion signal; causing an adaptive filter to have faster adaption in response to the change in the feedback path being above a first threshold, otherwise causing the adaptive filter to have slower adaption in response to the change in the feedback path being below a second threshold; and using an output of the adaptive filter to form a feedback cancellation signal that is inserted into the digitized audio input signal to cancel feedback.

Embodiment 37 includes the method of embodiment 36, wherein the motion detector comprises one or more accelerometers. Embodiment 38 includes the method of embodiment 36 or 37, wherein the motion signal indicates a rapid motion of the head a wearer of the ear-wearable device. Embodiment 39 includes the method of embodiment 36 or 37, wherein the motion signal indicates that a wearer of the ear-wearable device is or will be moving an object in proximity to the ear-wearable device, the movement of the object affecting the feedback path. Embodiment 40 includes the method of any of embodiments 36-39, wherein causing the adaptive filter to have faster adaption comprises setting a first mode of the adaptive filter, and wherein causing the adaptive filter to have slower adaption in response to determining the change in the feedback path is below the second threshold comprises setting a second mode of the adaptive filter. Embodiment 41 includes the method of embodiment 40, wherein the adaptive filter uses different step sizes in the first and second modes. Embodiment 42 includes the method of embodiment 41, wherein the first mode uses a larger step size than the second mode. Embodiment 43 includes the method of any of embodiments 36-42, wherein the adaptive filter uses different optimization algorithms in the first and second modes. Embodiment 44 includes the method of embodiment 43, wherein to the first mode uses a least square algorithm (NLMS) mode and the second mode uses a sign-normalized NLMS mode.

Embodiment 45 includes the method of any of embodiments 36-39, wherein a first output of the adaptive filter is combined with a second output of a second adaptive filter to form the output, and wherein causing the adaptive filter to have faster adaption comprises using a first mixing weight when combining the first and second outputs, and wherein causing the adaptive filter to have slower adaption comprises using a second mixing weight when combining the first and second outputs. Embodiment 46 includes the method of any of embodiments 36-45, wherein the change in the feedback path is detected based on a combination of the motion signal and an acoustic feature of the digitized audio input signal. Embodiment 47 includes the method of any of embodiments 36-46, wherein the change in the feedback path is determined based on a combination of the motion signal and an error signal, the error signal formed by inserting the output of the adaptive filter into the audio input signal.

Embodiment 47A includes method of any of embodiments 36-47, wherein determining the change in the feedback path based on the motion signal comprises inputting the motion signal into a decoder, the decoder configured via training data to map the motion signal to the change in the feedback path. Embodiment 47B includes the method of embodiment 47A, wherein the motion signal comprises three signals corresponding to three orthogonal axes of movement, the three signals being input to the decoder. Embodiment 47C includes the method of embodiment 47A or 47B, wherein the motion signal comprises current and previous samples of the motion signal over a time interval.

Embodiment 47D includes the method of any of embodiments 36-47, wherein determining the change in the feedback path based on the motion signal comprises: determining a current magnitude of the motion signal for a current sampling time step; and determining an asymmetrically smoothed magnitude based on the current magnitude and a previous smoothed magnitude, the change in the feedback path being determined if the smoothed magnitude satisfies a threshold. Embodiment 47E includes the method of embodiment 47D, further comprising bandpass filtering the motion signal before the current magnitude of the motion signal is determined, the bandpass filter emphasizing natural movements of the user. Embodiment 47F includes the method of embodiment 47D or 47E, wherein the asymmetric smoothed magnitude changes by a first coefficient $\kappa_R$ when the current magnitude of the motion signal is increasing compared to the previous smoothed magnitude and a second coefficient $\kappa_R$ when the current magnitude of the motion signal is decreasing compared to the previous smoothed magnitude, wherein $\kappa_R > \kappa_F$.

Embodiment 48 is a method comprising: digitizing an audio input signal from an input sensor of an ear-wearable device; receiving a motion signal indicative of motion of the ear-wearable device; detecting a change in a feedback path based on the motion signal; setting a first mode of an adaptive filter in response to determining the change in the feedback path exceeds a first threshold, the adaptive filter having a faster adaptation to feedback perturbations in the first mode compared to a second mode; setting the second mode of the adaptive filter if the change in the feedback path is below a second threshold; and inserting an output of the adaptive filter into the digitized audio input signal to cancel feedback.

Embodiment 49 includes the method of embodiment 48, wherein the motion signal is received from one or more accelerometers. Embodiment 50 includes the method of embodiment 48 or 49, wherein the motion signal indicates a rapid motion of the head a wearer of the ear-wearable device. Embodiment 51 includes the method of embodiment 48 or 49, wherein the motion signal indicates that a wearer of the ear-wearable device is or will be moving an object in proximity to the ear-wearable device, the movement of the object affecting the feedback path.

Embodiment 52 includes the method of any of embodiments 48-51, wherein the adaptive filter uses different step sizes in the first and second modes. Embodiment 53 includes the method of embodiment 52, wherein the first mode uses a larger step size than the second mode. Embodiment 54 includes the method of any of embodiments 48-53, wherein the adaptive filter uses different optimization algorithms in the first and second modes. Embodiment 55 includes the method of embodiment 54, wherein to the first mode uses a least square algorithm (NLMS) mode and the second mode uses a sign-normalized NLMS mode.

Embodiment 56 includes the method of any of embodiments 48-55, further comprising: combining a first output of the adaptive filter being combined with a second output of a second adaptive filter to form the output; and changing a mixing weight applied to the adaptive filter and the second adaptive filter is changed in response to determining the change in the feedback path. Embodiment 57 includes the method of any of embodiments 48-56, wherein the change in the feedback path is determined based on a combination of the motion signal and an acoustic feature of the digitized audio input signal. Embodiment 58 includes the method of any of embodiments 48-57, wherein the change in the feedback path is determined based on a combination of the motion signal and an error signal, the error signal formed by inserting the output of the adaptive filter into the digitized audio input signal.

Embodiment 59 is a method comprising: digitizing an audio input signal from an input sensor of an ear-wearable device; receiving a motion signal indicative of motion of the ear-wearable device; determining a change in a feedback path based on the motion signal; setting a first mixing weight of the first and second adaptive filters in response to the change in the feedback path exceeding a first threshold, the first mixing weight causing the combined output of the first and second adaptive filters to have a faster adaptation to feedback perturbations compared to a second mixing weight; setting the second mixing weight in response to the change in the feedback path being below a second threshold; and inserting the combined output of the first and second adaptive filters into the digitized audio input signal to cancel feedback.

Embodiment 60 includes the method of embodiment 59, wherein the motion signal is received from one or more accelerometers. Embodiment 61 includes the method of embodiment 59 or 60, wherein the motion signal indicates a rapid motion of the head a wearer of the ear-wearable device. Embodiment 62 includes the method of embodiment 59 or 60, wherein the motion signal indicates that a wearer of the ear-wearable device is or will be moving an object in proximity to the ear-wearable device, the movement of the object affecting the feedback path.

Embodiment 63 includes the method of any of embodiments 59-62, wherein the change in the feedback path is detected based on a combination of the motion signal and an acoustic feature of the digitized input signal. Embodiment 64 includes the method of any of embodiments 59-63, wherein the change in the feedback path is detected based on a combination of the motion signal and an error signal, the error signal formed by inserting the output of the adaptive filter into the input signal.

Although reference is made herein to the accompanying set of drawings that form part of this disclosure, one of at least ordinary skill in the art will appreciate that various adaptations and modifications of the embodiments described herein are within, or do not depart from, the scope of this disclosure. For example, aspects of the embodiments described herein may be combined in a variety of ways with each other. Therefore, it is to be understood that, within the scope of the appended claims, the claimed invention may be practiced other than as explicitly described herein.

All references and publications cited herein are expressly incorporated herein by reference in their entirety into this disclosure, except to the extent they may directly contradict this disclosure. Unless otherwise indicated, all numbers expressing feature sizes, amounts, and physical properties used in the specification and claims may be understood as being modified either by the term "exactly" or "about." Accordingly, unless indicated to the contrary, the numerical parameters set forth in the foregoing specification and attached claims are approximations that can vary depending upon the desired properties sought to be obtained by those skilled in the art utilizing the teachings disclosed herein or, for example, within typical ranges of experimental error.

The recitation of numerical ranges by endpoints includes all numbers subsumed within that range (e.g. 1 to 5 includes 1, 1.5, 2, 2.75, 3, 3.80, 4, and 5) and any range within that range. Herein, the terms "up to" or "no greater than" a number (e.g., up to 50) includes the number (e.g., 50), and the term "no less than" a number (e.g., no less than 5) includes the number (e.g., 5).

The terms "coupled" or "connected" refer to elements being attached to each other either directly (in direct contact with each other) or indirectly (having one or more elements between and attaching the two elements). Either term may be modified by "operatively" and "operably," which may be used interchangeably, to describe that the coupling or connection is configured to allow the components to interact to carry out at least some functionality (for example, a radio chip may be operably coupled to an antenna element to provide a radio frequency electric signal for wireless communication).

Terms related to orientation, such as "top," "bottom," "side," and "end," are used to describe relative positions of components and are not meant to limit the orientation of the embodiments contemplated. For example, an embodiment described as having a "top" and "bottom" also encompasses embodiments thereof rotated in various directions unless the content clearly dictates otherwise.

Reference to "one embodiment," "an embodiment," "certain embodiments," or "some embodiments," etc., means that a particular feature, configuration, composition, or characteristic described in connection with the embodiment is included in at least one embodiment of the disclosure. Thus, the appearances of such phrases in various places throughout are not necessarily referring to the same embodiment of the disclosure. Furthermore, the particular features, configurations, compositions, or characteristics may be combined in any suitable manner in one or more embodiments.

The words "preferred" and "preferably" refer to embodiments of the disclosure that may afford certain benefits, under certain circumstances. However, other embodiments may also be preferred, under the same or other circumstances. Furthermore, the recitation of one or more preferred embodiments does not imply that other embodiments are not useful and is not intended to exclude other embodiments from the scope of the disclosure.

As used in this specification and the appended claims, the singular forms "a," "an," and "the" encompass embodiments having plural referents, unless the content clearly dictates otherwise. As used in this specification and the appended claims, the term "or" is generally employed in its sense including "and/or" unless the content clearly dictates otherwise.

As used herein, "have," "having," "include," "including," "comprise," "comprising" or the like are used in their open-ended sense, and generally mean "including, but not limited to." It will be understood that "consisting essentially of," "consisting of," and the like are subsumed in "comprising," and the like. The term "and/or" means one or all of the listed elements or a combination of at least two of the listed elements.

The phrases "at least one of," "comprises at least one of," and "one or more of" followed by a list refers to any one of the items in the list and any combination of two or more items in the list.

The invention claimed is:

1. An ear-wearable device, comprising:
an input sensor that provides an audio input signal, the audio input signal being digitized via circuitry of the ear-wearable device;
an adaptive feedback canceller comprising an adaptive filter producing an output that is inserted into the digitized audio input signal to cancel feedback;
a motion detector providing a motion signal indicative of motion of the ear-wearable device; and
a processor operable to determine a change in a feedback path based on the motion signal indicating a rapid motion of a head of a wearer of the ear-wearable device, the processor causing the adaptive filter to have faster adaption in response to the change in the feedback path being above a first threshold, the processor causing the adaptive filter to have slower adaption in response to the change in the feedback path being below a second threshold.

2. The ear-wearable device of claim 1, wherein the motion signal indicates that a wearer of the ear-wearable device is or will be moving an object in proximity to the ear-wearable device, the movement of the object affecting the feedback path.

3. The ear-wearable device of claim 1, wherein causing the adaptive filter to have faster adaption comprises setting a first mode of the adaptive filter, and wherein causing the adaptive filter to have slower adaption in response to determining the change in the feedback path is below the second threshold comprises setting a second mode of the adaptive filter.

4. The ear-wearable device of claim 3, wherein the adaptive filter uses different step sizes in the first and second modes.

5. The ear-wearable device of claim 4, wherein the first mode uses a larger step size than the second mode.

6. The ear-wearable device of claim 3, wherein the adaptive filter uses different optimization algorithms in the first and second modes.

7. The ear-wearable device of claim 6, wherein the first mode uses a least square algorithm (NLMS) mode and the second mode uses a sign-normalized NLMS mode.

8. The ear-wearable device of claim 1, wherein the adaptive feedback canceller comprises a second adaptive filter, a first output of the adaptive filter being combined with a second output of the second adaptive filter to form the feedback cancellation signal, and wherein causing the adaptive filter to have faster adaption comprises using a first mixing weight when combining the first and second outputs and wherein causing the adaptive filter to have slower adaption comprises using a second mixing weight when combining the first and second outputs.

9. The ear-wearable device of claim 1, wherein the processor determines the change in the feedback path based on a combination of the motion signal and an acoustic feature of the digitized audio input signal.

10. The ear-wearable device of claim 1, wherein the processor determines the change in the feedback path based on a combination of the motion signal and an error signal, the error signal formed by inserting the output of the adaptive filter into the digitized audio input signal.

11. The ear-wearable device of claim 1, wherein causing the adaptive filter to have slower adaption in response to the change in the feedback path being below the second threshold comprises measuring statistics of the motion signal over time, wherein the feedback path is below the second threshold if the statistics are similar to corresponding resting statistics measured at rest, and wherein the resting statistics are adaptively updated when the change in the feedback path being is below the second threshold.

12. The ear-wearable device of claim 1, wherein one or both of the first and second thresholds are adaptively updated over time based on ambient conditions.

13. The ear-wearable device of claim 1, wherein determining the change in the feedback path based on the motion signal comprises inputting the motion signal into a decoder, the decoder configured via training data to map the motion signal to the change in the feedback path.

14. The ear-wearable device of claim 1, wherein determining the change in the feedback path based on the motion signal comprises:
determining a current magnitude of the motion signal for a current sampling time step; and
determining an asymmetrically smoothed magnitude based on the current magnitude and a previous smoothed magnitude, the change in the feedback path being determined if the smoothed magnitude satisfies a threshold.

15. The ear-wearable device of claim 14, wherein the motion signal is bandpass filtered before the current magnitude of the motion signal is determined, the bandpass filter emphasizing natural movements of a user.

16. The ear-wearable device of claim 14, wherein the asymmetric smoothed magnitude changes by a first coefficient KR when the current magnitude of the motion signal is increasing compared to the previous smoothed magnitude and a second coefficient KR when the current magnitude of the motion signal is decreasing compared to the previous smoothed magnitude, wherein $\kappa_R > \kappa_F$.

17. A method comprising:
digitizing an audio input signal from an input sensor of an ear-wearable device;
receiving a motion signal indicative of motion of the ear-wearable device, wherein the motion signal indicates at least one of a rapid motion of the head of a wearer of the ear-wearable device or that a wearer of the ear-wearable device is or will be moving an object in proximity to the ear-wearable device, the movement of the object affecting the feedback path;
detecting a change in a feedback path based on the motion signal;
causing an adaptive filter to have faster adaption in response to the change in the feedback path being above a first threshold, otherwise causing the adaptive filter to have slower adaption in response to the change in the feedback path being below a second threshold; and
using an output of the adaptive filter to form a feedback cancellation signal that is inserted into the digitized audio input signal to cancel feedback.

18. The method of claim 17, wherein causing the adaptive filter to have faster adaption comprises setting a first mode of the adaptive filter, and wherein causing the adaptive filter to have slower adaption in response to determining the change in the feedback path is below the second threshold comprises setting a second mode of the adaptive filter, wherein the adaptive filter uses different step sizes in the first and second modes.

19. An ear-wearable device, comprising:
- an input sensor that provides an audio input signal, the audio input signal being digitized via circuitry of the ear-wearable device;
- an adaptive feedback canceller comprising an adaptive filter producing an output that is inserted into the digitized audio input signal to cancel feedback;
- a motion detector providing a motion signal indicative of motion of the ear-wearable device; and
- a processor operable to determine a change in a feedback path based on the motion signal, the processor causing the adaptive filter to have faster adaption in response to the change in the feedback path being above a first threshold, the processor causing the adaptive filter to have slower adaption in response to the change in the feedback path being below a second threshold;
- wherein determining the change in the feedback path based on the motion signal comprises inputting the motion signal into a decoder, the decoder configured via training data to map the motion signal to the change in the feedback path.

20. The device of claim 19, wherein the motion signal indicates that a wearer of the ear-wearable device is or will be moving an object in proximity to the ear-wearable device, the movement of the object affecting the feedback path.

* * * * *